US010977568B2

(12) United States Patent
Shibuya et al.

(10) Patent No.: US 10,977,568 B2
(45) Date of Patent: Apr. 13, 2021

(54) INFORMATION PROCESSING APPARATUS, DIAGNOSIS METHOD, AND PROGRAM

(71) Applicant: Hitachi Power Solutions Co., Ltd., Hitachi (JP)

(72) Inventors: Hisae Shibuya, Tokyo (JP); Shouzou Miyabe, Hitachi (JP); Tadashi Suzuki, Hitachi (JP)

(73) Assignee: Hitachi Power Solutions Co., Ltd., Hitachi (JP)

( * ) Notice: Subject to any disclaimer, the term of this patent is extended or adjusted under 35 U.S.C. 154(b) by 1043 days.

(21) Appl. No.: 14/614,060

(22) Filed: Feb. 4, 2015

(65) Prior Publication Data

US 2015/0220847 A1    Aug. 6, 2015

(30) Foreign Application Priority Data

Feb. 5, 2014 (JP) .............................. JP2014-020024

(51) Int. Cl.
*G06N 5/04* (2006.01)
*G06N 20/00* (2019.01)
*G05B 23/02* (2006.01)

(52) U.S. Cl.
CPC ......... *G06N 5/047* (2013.01); *G05B 23/0227* (2013.01); *G06N 20/00* (2019.01)

(58) Field of Classification Search
CPC ..... G06N 5/047; G06N 20/00; G05B 23/0227
See application file for complete search history.

(56) References Cited

U.S. PATENT DOCUMENTS 5,337,371 A * 8/1994 Sato .......................... F24F 11/00
382/100
6,952,662 B2 10/2005 Wegerich et al.
(Continued)

FOREIGN PATENT DOCUMENTS

JP   62-85895 A   4/1987
JP   2-160460 A   6/1990
(Continued)

OTHER PUBLICATIONS

Galar et al, Maintenance Decision Making Based on Different Types of Data Fusion, 2012.*
(Continued)

*Primary Examiner* — Eric Nilsson
(74) *Attorney, Agent, or Firm* — Crowell & Moring LLP

(57) ABSTRACT

A phenomenon pattern extraction unit extracts a phenomenon pattern of a past sensor signal of a facility. A related information correlation unit correlates the sensor signal based on maintenance history information. A phenomenon pattern classification reference creation unit creates a classification reference for classifying a phenomenon pattern based on the extracted phenomenon pattern and a work keyword included in the maintenance history information correlated with the sensor signal as the source of the phenomenon pattern. A phenomenon pattern classification unit classifies the phenomenon pattern based on the classification reference. A diagnosis model creation unit creates a diagnosis model for estimating a work keyword suggested to a maintenance worker based on the classified phenomenon pattern and the work keyword.

15 Claims, 27 Drawing Sheets

(56) References Cited

U.S. PATENT DOCUMENTS

| | | | | |
|---|---|---|---|---|
| 2006/0288260 A1* | 12/2006 | Xiao | ............... | G05B 23/0232 714/48 |
| 2012/0316835 A1* | 12/2012 | Maeda | ............... | G01D 3/08 702/183 |
| 2013/0073260 A1 | 3/2013 | Maeda et al. | | |
| 2013/0173218 A1 | 7/2013 | Maeda et al. | | |
| 2013/0282336 A1 | 10/2013 | Maeda et al. | | |
| 2014/0129536 A1* | 5/2014 | Anand | ............... | G06Q 10/0635 707/706 |
| 2014/0195184 A1 | 7/2014 | Maeda et al. | | |

FOREIGN PATENT DOCUMENTS

| | | |
|---|---|---|
| JP | 6-19531 A | 1/1994 |
| JP | 2008-140109 A | 6/2008 |
| JP | 2009-110066 A | 5/2009 |
| JP | 2010-231486 A | 10/2010 |
| JP | 2011-227706 A | 11/2011 |
| JP | 2012-58890 A | 3/2012 |
| JP | 2012-113586 A | 6/2012 |
| JP | 2013-41448 A | 2/2013 |

OTHER PUBLICATIONS

Hwang et al, A Survey of Fault Detection, Isolation, and Reconfiguration Methods, 2010.*

Xu et al, Detecting Large-Scale System Problems by Mining Console Logs, 2009.*

Chougule et al, An integrated framework for effective service and repair in the automotive domain: An application of association mining and case-based reasoning (Year: 2011).*

Reidemeister, Fault Diagnosis in Enterprise Software Systems Using Discrete Monitoring Data (Year: 2012).*

Japanese Office Action dated Jan. 20, 2015, including English translation (three (3) pages).

Japanese Office Action dated Oct. 21, 2014, including English translation (six (6) pages).

* cited by examiner

FIG.3

| | 101a | | 101b | | | |
|---|---|---|---|---|---|---|
| DATE | SENSOR1 | SENSOR2 | SENSOR3 | SENSOR4 | SENSOR5 | ... |
| 2007.01.01 0:00:00 | 27935 | 478 | 179.9 | 14.6 | 1.18 | ... |
| 2007.01.01 0:00:30 | 27935 | 478 | 179.8 | 14.6 | 1.17 | ... |
| ⋮ | ⋮ | ⋮ | ⋮ | ⋮ | ⋮ | ⋮ |

FIG.4

| ALARM ┌102a | GENERATION DATE ┌102b | MAINTENANCE WORK REPORT ┌102c | COST ┌102d | DOWNTIME ┌102e |
|---|---|---|---|---|
| DECREASE IN OIL TEMPERATURE | 20xx/xx/xx hh:mm:ss | assembly new machine··· | 123··· | 20xx/xx/xx hh:mm:ss ~ 20xx/xx/xx hh:mm:ss |
| ⋮ | ⋮ | ⋮ | ⋮ | ⋮ |

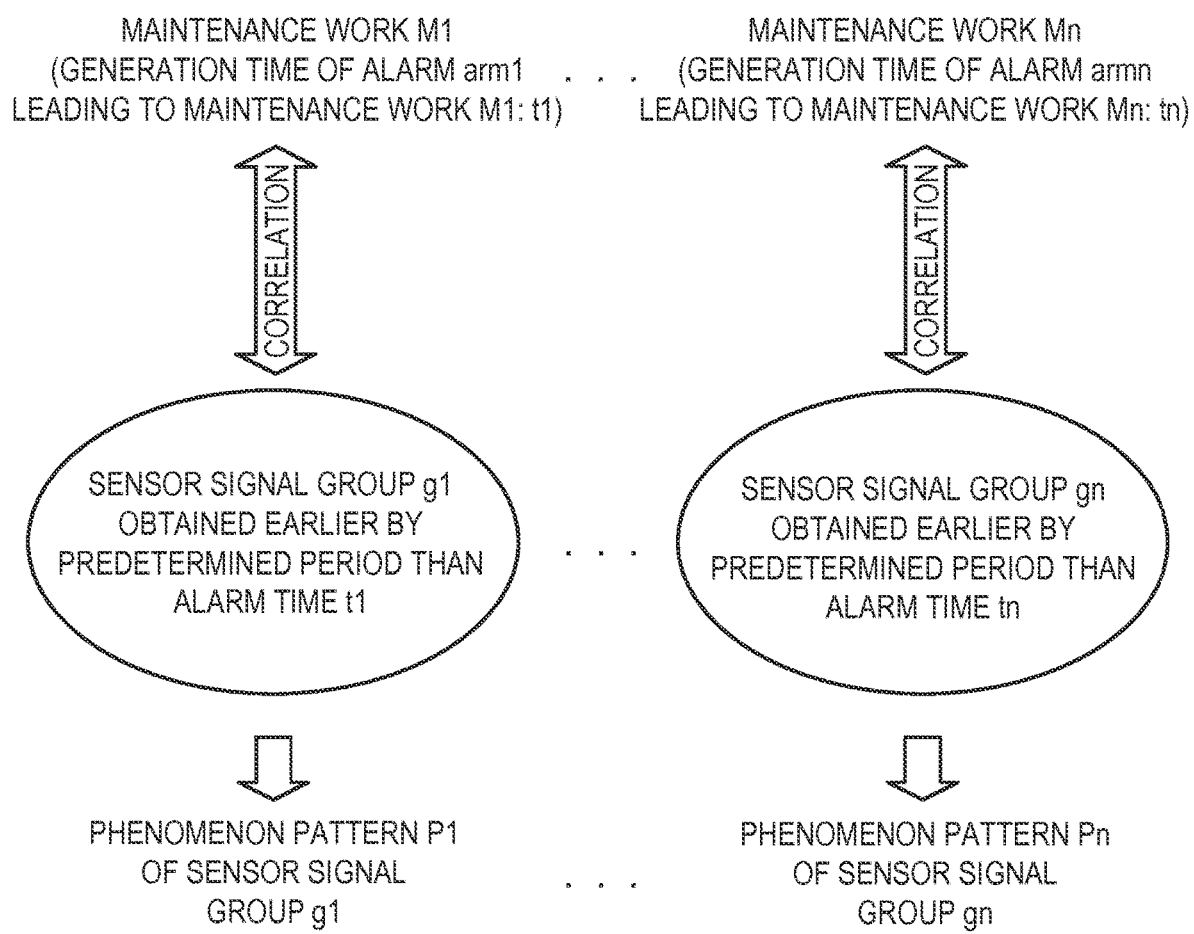

FIG.15A

| ID | DOCUMENT | COST |
|---|---|---|
| 1 | assembly new machine | 6.120 |
| 2 | receive new machine at port | 6.102 |
| 3 | remove rh arm cylinder sn h09-0002-ack | 6.055 |
| ... | ... | ... |
| 9674 | replace oring main cooler | -2.175 |
| 9675 | replace grease injector sl v | -2.231 |

FIG.15C

| | |
|---|---|
| sn(3.4) | op(2.65) |
| remove(3.2) | install(2.65) |
| installed(3.12) | refer(2.62) |
| cylinder(2.98) | fan(2.53) |
| roller(2.83) | date(2.5) |
| removed(2.76) | change(2.49) |
| lower(2.69) | lh(2.48) |
| replacement (2.69) | no(2.47) |
| wo(2.67) | worn(2.46) |
| or(2.67) | n(2.44) |

FIG.16

| DIAGNOSIS MODEL | | WORK KEYWORD 401a |||||||
|---|---|---|---|---|---|---|---|---|
| | | REPLACEMENT |||||||
| | | FILTER | VALVE | PUMP | SEAL | SENSOR | PIPE | ... |
| PHENOMENON PATTERN | TYPE A | 80% | 20% | | | | | |
| | TYPE B | | 70% | | | 10% | 20% | |
| | TYPE C | | 5% | 90% | 5% | | | |
| | ... | | | | | | | |

FIG. 19

| Alarm Diagnosis Model | Alarm | | | | |
|---|---|---|---|---|---|
| Phenomenon Pattern | DECREASE IN OIL PRESSURE | DECREASE IN WATER PRESSURE | INCREASE IN WATER TEMPERATURE | START DELAY | ... |
| TYPE OF DECREASE IN OIL PRESSURE | 80% | 10% | | | |
| TYPE OF DECREASE IN WATER PRESSURE | | 90% | | 10% | 10% |
| TYPE OF INCREASE IN WATER TEMPERATURE | 20% | | 70% | 10% | |
| ... | | | | | |

| WORK DIAGNOSIS MODEL | | WORK KEYWORD 801 | | | |
|---|---|---|---|---|---|
| | | REPLACEMENT 801a | | | |
| | | PUMP | SEAL | PART X | PART Y 801b |
| DECREASE IN WATER PRESSURE | TYPE a | 95% | 5% | | |
| | TYPE b | | 90% | | 5% |
| | TYPE c | | | 100% | |

| No. | SITE | MA-CHINE | 2013/7 | | | | | | 2013/8 | | | |
|---|---|---|---|---|---|---|---|---|---|---|---|---|
|  |  |  | 26 | 27 | 28 | 29 | 30 | 31 | 1 | 2 | 3 | 4 |
| 1 | A101 | 1 |  |  | ○ | ○ | ○ | ○ | ○ | ○ | ○ | ○ |
| 2 | A101 | 2 |  |  |  | ○ | ○ |  |  |  |  |  |
| 3 | A102 | 1 |  |  |  |  |  |  |  |  |  |  |
| 4 | A102 | 2 |  |  |  |  |  |  |  |  |  |  |
| 5 | A102 | 3 |  |  |  |  |  |  |  |  |  |  |
| 6 | A102 | 4 |  |  |  |  |  |  |  |  |  |  |
| 7 | A103 | 1 |  |  | ○ | ○ |  |  |  | ○ |  |  |
| 8 | A103 | 2 | ○ | ○ |  |  |  |  |  |  |  |  |

INFORMATION PROCESSING APPARATUS, DIAGNOSIS METHOD, AND PROGRAM

BACKGROUND

Technical Field

The present invention relates to an information processing apparatus, a diagnosis method, and a program. This application claims the priority based on the Japanese Patent Application No. 2014-020024 filed on Feb. 5, 2014. The entire contents of which are incorporated herein by reference for all purpose.

Related Art

In a plant or a facility, it is important to detect the abnormality at an early timing based on multi-dimensional time-series data output therefrom and to diagnose the cause thereof. For this reason, a plurality of sensors are attached to the facility or the plant as a target, and the abnormality thereof is determined based on the monitoring reference of each sensor.

For example, U.S. Pat. No. 6,952,662 discloses a method of individually calculating the similarity between observation data and past learned data, calculating an estimation value by a linear combination of data weighted in response to the similarity, and detecting abnormality based on a deviation degree between the estimation value and the observation data. Further, JP 2009-110066 A discloses a maintenance chart display device that easily recognizes long-term maintenance work information of an apparatus.

SUMMARY

In the method of detecting the abnormality case by case disclosed in U.S. Pat. No. 6,952,662, the estimation value is calculated by the linear combination of the data having high similarity with the observation data based on the learned data, and the deviation degree between the estimation value and the observation data is output. For this reason, the work environment of the facility, the work change state caused by the age of the facility, the work condition, and the replacement of parts may be taken into consideration for the learned data. However, there is a need for an additional description for why the abnormality is included in the observation data.

Further, in the method disclosed in JP 2009-110066 A, a failure history or a work history is stored in a database so as to be retrieved later. Accordingly, a system that acquires knowledge useful for the maintenance work is constructed. Here, the information items on the failure history or the work history are correlated with one another through the retrieval, and hence the information items are provided in a visible form. However, the abnormality detection operation is not clearly correlated with the maintenance history information. Thus, it is difficult to mention that the maintenance work information stored in the system may be efficiently used.

Therefore, an object of the invention is to provide a technique capable of more accurately diagnosing a facility.

The invention includes means for solving at least a part of the above-described problems, and the examples are as below. In order to solve the above-described problems, an information processing apparatus according to the invention includes: a phenomenon pattern extraction unit that extracts a phenomenon pattern of a past sensor signal of a facility; a correlation unit that correlates the sensor signal based on maintenance history information; a classification reference creation unit that creates a classification reference for classifying the phenomenon pattern based on a work keyword included in the maintenance history information correlated with the sensor signal as a source of the phenomenon pattern and the phenomenon pattern extracted by the phenomenon pattern extraction unit; a phenomenon pattern classification unit that classifies the phenomenon pattern based on the classification reference created by the classification reference creation unit; and a diagnosis model creation unit that creates a diagnosis model for estimating a work keyword suggested to a maintenance worker based on the work keyword and the phenomenon pattern classified by the phenomenon pattern classification unit.

According to the invention, it is possible to more accurately diagnose the facility.

The object, the configuration, and the effect described above will be proved by the description of the embodiments below.

BRIEF DESCRIPTION OF DRAWINGS

FIG. 3 is a diagram illustrating a data configuration example of an operation information DB;

FIG. 4 is a diagram illustrating a data configuration example of a maintenance history information DB;

FIG. 14 is a diagram illustrating a correlation between a sensor signal and maintenance history information;

FIGS. 15A, 15B, and 15C are diagrams illustrating the extraction of a work keyword;

FIG. 16 is a diagram illustrating a diagnosis model;

FIG. 19 is a diagram illustrating a diagnosis model that is created by a diagnosis model creation unit;

FIG. 20 is a diagram illustrating a diagnosis model that is created by a diagnosis model creation unit;

FIG. 21 is a diagram illustrating an example of a list display screen of an abnormality detection result of the information processing apparatus;

DETAILED DESCRIPTION

First Embodiment

Figure 1:
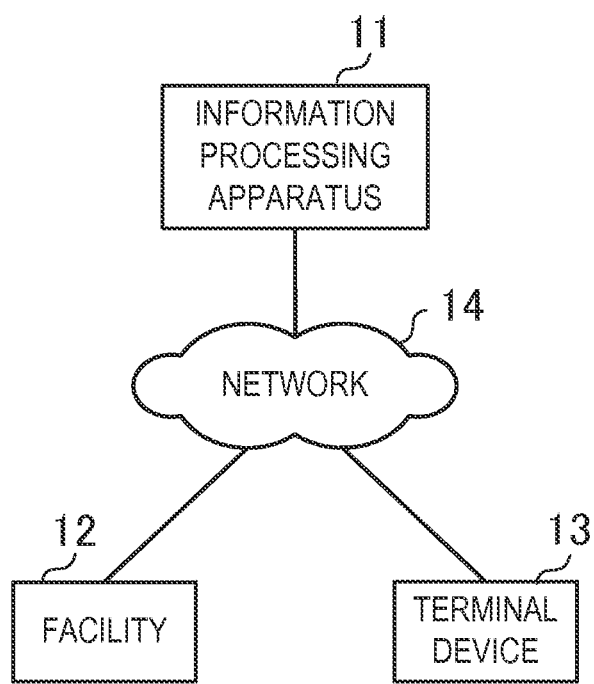
FIG. 1 is a diagram illustrating a configuration example of a system that uses an information processing apparatus according to a first embodiment.

FIG. 1 is a diagram illustrating a configuration example of a system that uses an information processing apparatus 11 according to a first embodiment. As illustrated in FIG. 1, an information processing apparatus 11, a facility 12, and a terminal device 13 are connected to one another via, for example, a network 14 such as an internet.

The information processing apparatus 11 detects the abnormality sign of the facility 12 based on a sensor signal obtained from the facility 12. Further, when the abnormality sign is detected, the information processing apparatus 11 suggests maintenance work for the abnormality sign. The information processing apparatus 11 is configured as, for example, a server.

The facility 12 is a gas turbine or a steam turbine of a power plant or an oil plant. The facility 12 includes, for example, various sensors such as an oil pressure sensor, a water pressure sensor, and a temperature sensor. The sensor signal of the sensor of the facility 12 is transmitted to the information processing apparatus 11 via the network 14.

The terminal device 13 receives a maintenance work report from a maintenance worker of the facility 12. For example, when the maintenance worker of the facility 12 performs the maintenance work of the facility 12, the maintenance work content is input to the terminal device 13. The terminal device 13 transmits the received maintenance work report to the information processing apparatus 11 via the network 14.

In the above-described configuration, each of the facility 12 and the terminal device 13 exists at one position, but may exist at a plurality of positions. Further, the information processing apparatus 11 may have the function of the terminal device 13. That is, the information processing apparatus 11 may receive the maintenance work report from the maintenance worker.

Furthermore, in a power company, hot water for heating a district is supplied by using waste heat of a gas turbine or a high-pressure steam or a low-pressure steam is supplied to the company. In a petrochemical company, a gas turbine or the like is used as a power supply facility. In this way, in various plants or facilities that use a gas turbine or the like, an abnormality detection process for detecting the problem or the sign of the facility is very important in order to suppress social damage as much as possible.

An apparatus that performs a diagnosis of detecting the abnormality involved with the degradation and the lifetime of the battery at an early timing needs to be provided in not only the gas turbine or the steam turbine, but also a waterwheel of a water power plant, an atomic furnace of an atomic power plant, a wind wheel of a wind power plant, an engine of an airplane or a heavy machine, a railway vehicle or a track, an escalator, an elevator, a medical instrument for MRI or the like, a device for manufacturing and inspecting a semiconductor or a flat display, and a label of equipment or a part. In recent years, it is important to check the abnormality (for various symptoms) for a human body as viewed from the diagnosis and the measurement of the brain wave in order to manage the health.

Figure 2:
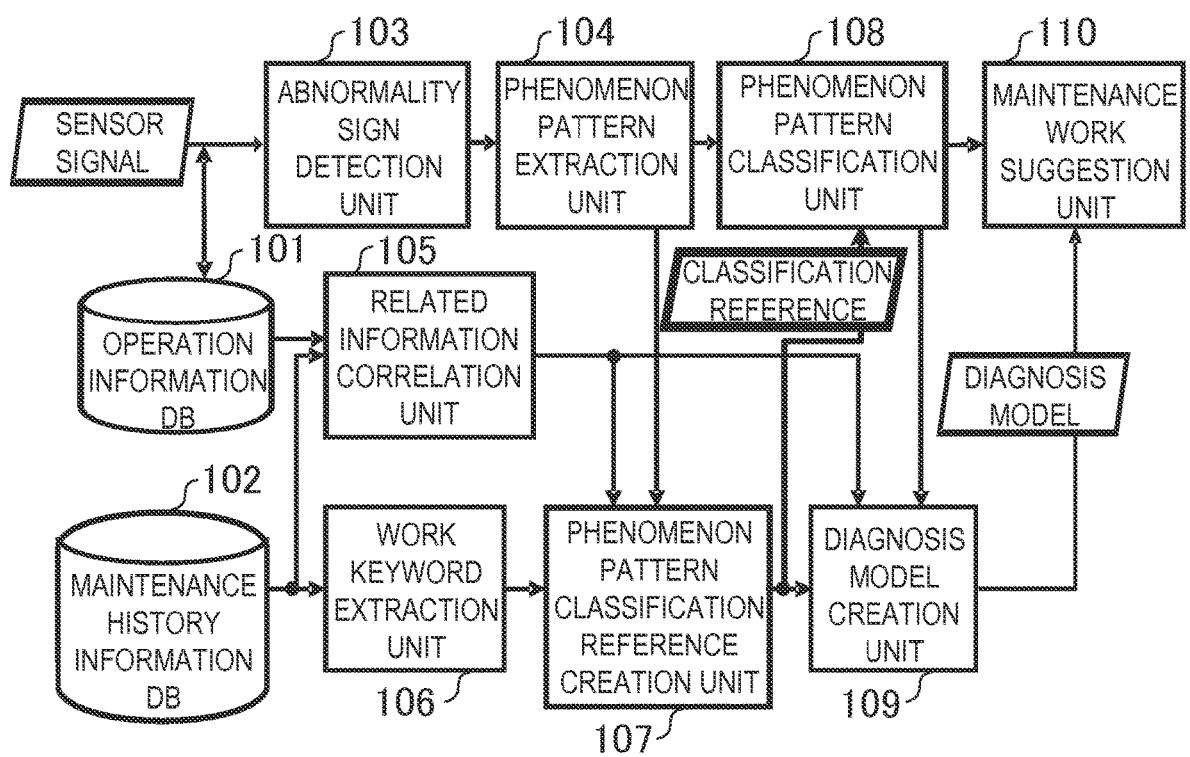
FIG. 2 is a diagram illustrating an example of a function block of the information processing apparatus.

FIG. 2 is a diagram illustrating an example of a function block of the information processing apparatus 11. As illustrated in FIG. 2, the information processing apparatus 11 includes an operation information DB (DB: Data Base) 101, a maintenance history information DB 102, an abnormality sign detection unit 103, a phenomenon pattern extraction unit 104, a related information correlation unit 105, a work keyword extraction unit 106, a phenomenon pattern classification reference creation unit 107, a phenomenon pattern classification unit 108, a diagnosis model creation unit 109, and a maintenance work suggestion unit 110.

The operation information DB 101 stores the sensor signal output from the facility 12.

FIG. 3 is a diagram illustrating a data configuration example of the operation information DB 101. As illustrated in FIG. 3, the operation information DB 101 stores a data 101a which stores a sensor signal output from the facility 12 and a sensor signal 101b.

A description will be made with reference to FIG. 2. The maintenance history information. DB 102 stores information involved with the maintenance work of the facility 12.

FIG. 4 is a diagram illustrating a data configuration example of the maintenance history information DB 102. As illustrated in FIG. 4, the maintenance history information DB 102 stores an alarm 102a which notifies the maintenance work of the facility 12, a date 102b which indicates the generation of the alarm, a maintenance work report 102c which is text information having a free description and is input from the terminal device 13, a cost 102d which is spent for the maintenance work, and a downtime 102e of the facility 12.

A description will be made with reference to FIG. 2. The abnormality sign detection unit 103 detects the abnormality sign of the facility 12 based on the sensor signal.

The phenomenon pattern extraction unit 104 extracts the phenomenon pattern of the sensor signal.

The related information correlation unit 105 correlates the sensor signal with the maintenance history information. For example, the related information correlation unit 105 extracts a sensor signal which has been generated during a predetermined period before the generation date 102b of the alarm, 102a and correlates the extracted sensor signal with the generation date 102b of the alarm 102a. More specifically, the related information correlation unit 105 extracts a predetermined amount of past sensor signals from the generation date 102b of the alarm 102a and correlates the extracted sensor signal with the generation date 102b of the alarm 102a. That is, the related information correlation unit 105 correlates the sensor signal involved with the maintenance work with each maintenance work.

The work keyword extraction unit 106 extracts the work keyword from the maintenance work report 102c and the correlated values thereof. The correlated value is, for example, the cost 102d or the downtime 102e.

The phenomenon pattern classification reference creation unit 107 creates a classification reference for classifying the phenomenon pattern by using the work keyword as a teacher.

The phenomenon pattern classification unit 108 classifies the phenomenon pattern extracted from the sensor signal based on the classification reference created by the phenomenon pattern classification reference creation unit 107.

The diagnosis model creation unit 109 creates a diagnosis model for estimating the work keyword suggested to the maintenance worker from the phenomenon pattern classification result.

The maintenance work suggestion unit 110 estimates the work keyword suggested to the maintenance worker by using the phenomenon pattern classification result and the diagnosis model, and suggests the maintenance work candidate based on the estimation result.

The operation of the information processing apparatus 11 includes two phases of a "diagnosis model creation phase" that creates the diagnosis model by using the past sensor signal and the maintenance history information and a "maintenance work suggestion phase" that detects the abnormality sign based on the sensor signal and suggests the maintenance work by using the created diagnosis model.

The process sequence of the diagnosis model creation phase will be described. First, the abnormality sign detection unit 103 detects the abnormality sign by using the past sensor signal stored in the operation information DB 101. Next, the phenomenon pattern extraction unit 104 extracts the phenomenon pattern by using the same sensor signal. Next, the related information correlation unit 105 correlates the past sensor signal stored in the operation information DB 101 with the maintenance history information stored in the maintenance history information DB 102. Next, the work keyword extraction unit 106 extracts the work keyword from the maintenance history information stored in the maintenance history information DB 102. Next, the phenomenon pattern classification reference creation unit 107 creates a classification reference for classifying the phenomenon pattern by using the work keyword as the teacher based on the correlated information obtained by the related information correlation unit 105. Next, the phenomenon pattern classification unit 108 classifies the phenomenon pattern extracted from the sensor signal by using the classification reference created by the phenomenon pattern classification reference creation unit 107. Next, the diagnosis model creation unit 109 creates a diagnosis model for estimating the work keyword suggested to the maintenance worker from the phenomenon pattern classification result by using the correlated information obtained by the related information correlation unit 105.

The process sequence in the maintenance work suggestion phase will be described. First, the abnormality sign detection unit 103 detects an abnormality sign by using the sensor signal (for example, the current sensor signal) used in the diagnosis target. Next, the phenomenon pattern extraction unit 104 extracts the phenomenon pattern. Next, the phenomenon pattern classification unit 108 classifies the extracted phenomenon pattern by using the classification reference. Next, the maintenance work suggestion unit 110 extracts the work keyword suggested to the maintenance worker by using the phenomenon pattern classification result classified by the phenomenon pattern classification unit 108 and the diagnosis model created by the diagnosis model creation unit 109 and suggests the maintenance work based on the work keyword.

Hereinafter, the blocks will be described in detail.

As described above, the facility 12 as a state monitoring target is a facility such as a gas turbine or a steam turbine. The facility 12 outputs a sensor signal indicating the state of the facility 12, and transmits the sensor signal to the information processing apparatus 11 via the network 14. The sensor signal which is transmitted to the information processing apparatus 11 is stored in the operation information DB 101.

As illustrated in FIG. 3, the sensor signal is a multi-dimensional time-series signal which is acquired every predetermined interval. The type of the sensor may be several hundred to several thousand types. The sensor detects, for example, a temperature of a cylinder, oil, or cooling water, a pressure of oil or cooling water, a rotation speed of a shaft, a room temperature, an operation time, and the like. The sensor signal includes not only a control signal indicating an output or a state, but also a control signal for controlling any target at a certain value.

Figure 5:
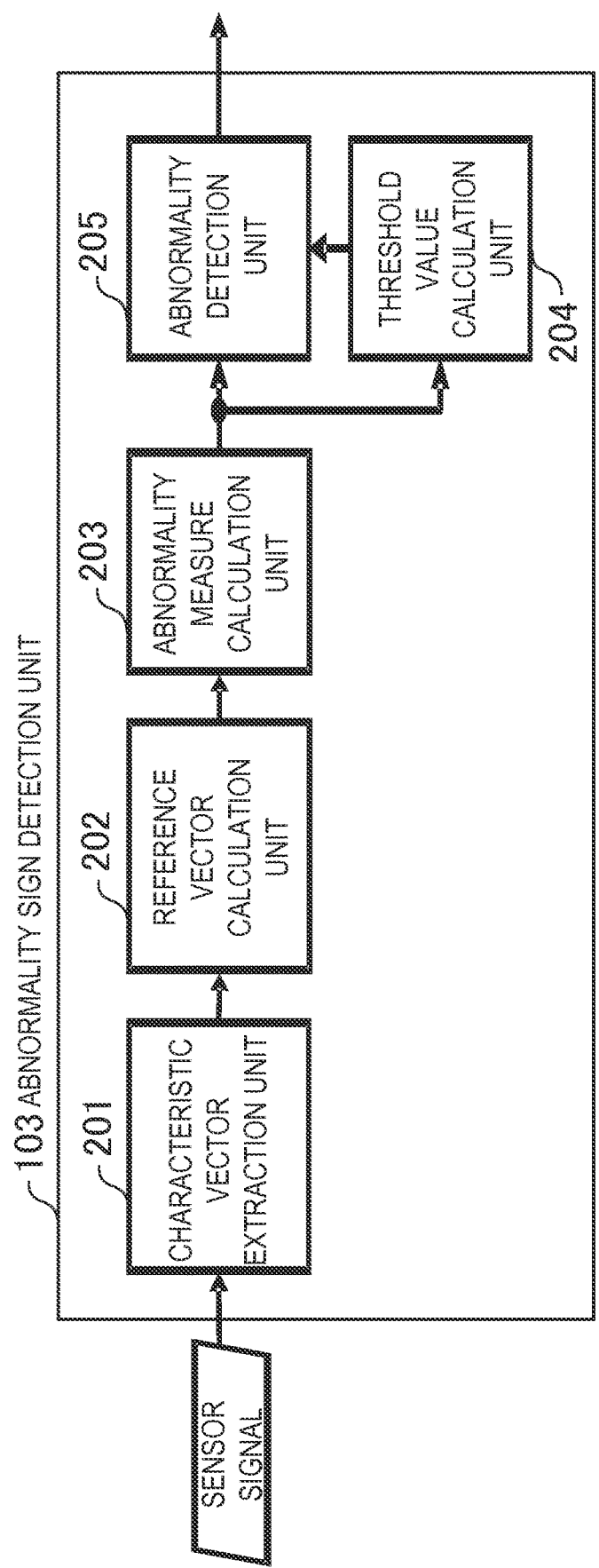
FIG. 5 is a diagram illustrating an example of a specific function block of an abnormality sign detection unit.

FIG. 5 is a diagram illustrating an example of a specific function block of the abnormality sign detection unit 103. As illustrated in FIG. 5, the abnormality sign detection unit 103 includes a characteristic vector extraction unit 201, a reference vector calculation unit 202, an abnormality measure calculation unit 203, a threshold value calculation unit 204, and an abnormality detection unit 205.

The characteristic vector extraction unit 201 extracts a characteristic vector based on the sensor signal. The characteristic vector is, for example, a vector which is obtained based on the value of the sensor signal. Specifically, the characteristic vector is a vector based on the sensor signal 101b of FIG. 3.

The reference vector calculation unit 202 calculates the reference characteristic vector of each time based on a group of the characteristic vector during a predetermined learning period and the characteristic vector of each time.

The abnormality measure calculation unit 203 calculates the abnormality measure based on a difference between the characteristic vector of each time and the reference characteristic vector.

The threshold value calculation unit 204 calculates a threshold value based on the abnormality measure during a predetermined learning period.

The abnormality detection unit 205 detects the abnormality sign by comparing the abnormality measure calculated by the abnormality measure calculation unit 203 with the threshold value calculated by the threshold value calculation unit 204.

The operation of the abnormality sign detection unit 103 includes two phases of a "learning phase" and an "abnormality detection phase". The "learning phase" corresponds to the "diagnosis model creation phase", and the "abnormality detection phase" corresponds to the "maintenance work phase".

The abnormality sign detection unit 103 extracts the characteristic vector by using the data obtained during a designated period among the sensor signals (hereinafter, referred to as data) stored in the operation information DB 101 in the "learning phase". Here, the extracted data is referred to as the "learned data". Further, the abnormality sign detection unit 103 calculates the abnormality measure of the learned data by the cross validation and calculates the threshold value for determining the abnormality sign based on the abnormality measure of the entire learning data.

In the "abnormality detection phase", the abnormality sign detection unit 103 extracts the characteristic vector from the sensor signal during the period of the diagnosis target. Here, the extracted data is referred to as the "evaluation data". Further, the abnormality sign detection unit 103 calculates the abnormality measure by using the learned data and compares the abnormality measure with the threshold value to determine whether the abnormality sign exists.

Figure 6:
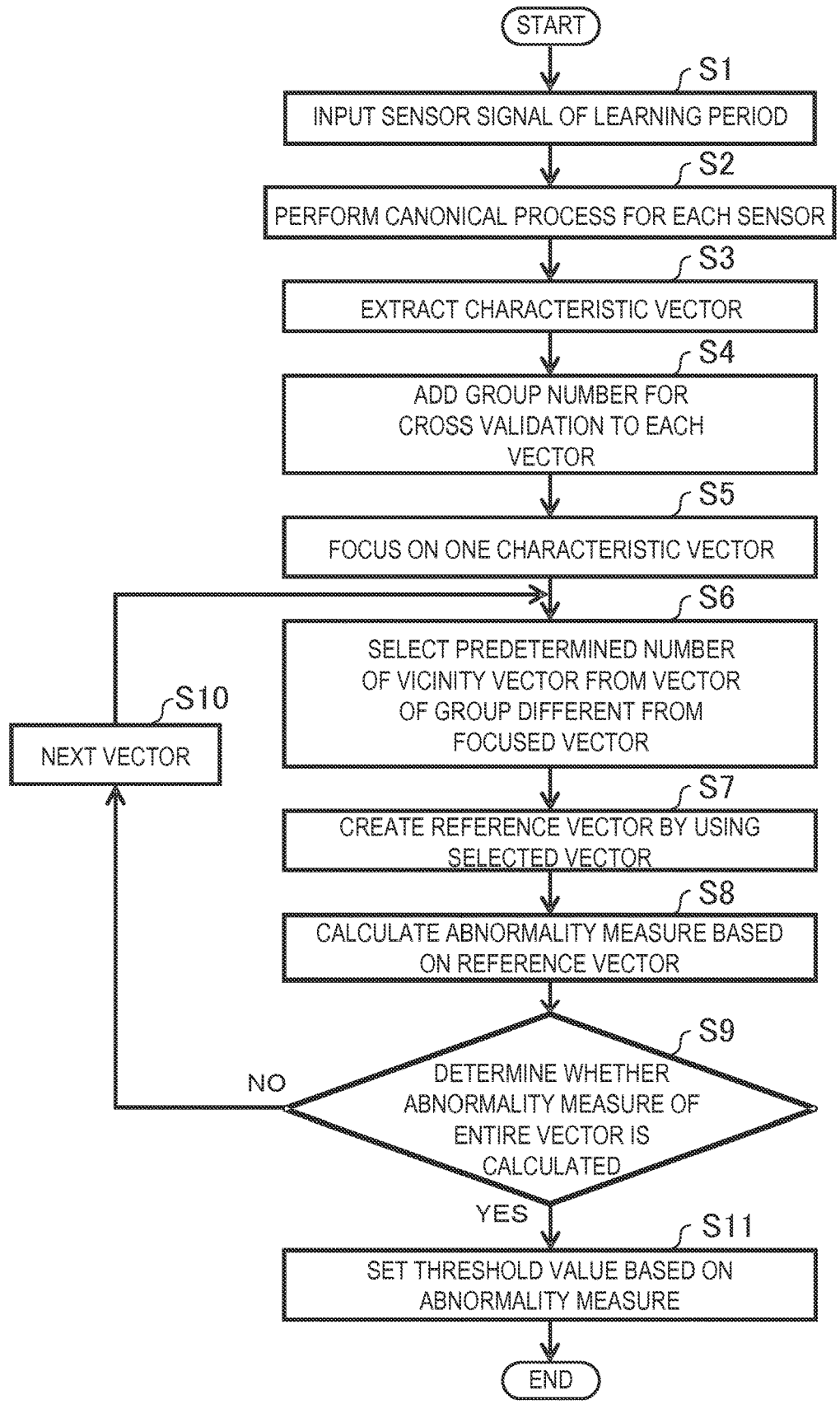
FIG. 6 is a flowchart illustrating a process sequence in a learning phase of the abnormality sign detection unit.

FIG. 6 is a flowchart illustrating a process sequence in the learning phase of the abnormality sign detection unit 103. The abnormality sign detection unit 103 performs the process of the flowchart of FIG. 6 in response to, for example, the user's learning instruction.

First, the characteristic vector extraction unit 201 inputs the sensor signal obtained during a period designated as the learning period from the operation information DB 101 (step S1).

Next, the characteristic vector extraction unit 201 performs a canonical process on each input sensor signal (step S2).

Next, the characteristic vector extraction unit 201 extracts the characteristic vector from the sensor signal subjected to the canonical process in step S2 (step S3).

Next, the reference vector calculation unit 202 adds a group number for the cross validation to the characteristic vector extracted in step S3 (step S4). For example, the group may be determined in a manner such that the characteristic vector obtained for one day is grouped as one group, the characteristic vector obtained during a predetermined period is grouped as one group, or the characteristic vector is evenly classified into a predetermined number of groups.

Next, the reference vector calculation unit 202 focuses on the first characteristic vector from the extracted characteristic vector (step S5).

Next, the reference vector calculation unit 202 selects a predetermined number of the characteristic vector in order close to the focused vector among the characteristic vector of the group different from the focused vector in step S1 (step S6).

Next, the reference vector calculation unit 202 calculates the reference vector by using the characteristic vector selected in step S6 (step S7).

Next, the abnormality measure calculation unit 203 calculates the abnormality measure based on the distance between the focused vector and the reference vector (step S8).

Next, the abnormality measure calculation unit 203 determines whether the abnormality measure calculation in the entire vector ends (step S9). When the abnormality measure calculation in the entire vector ends, the abnormality measure calculation unit 203 performs the process in step S11. When the abnormality measure calculation in the entire vector does not end, the abnormality measure calculation unit 203 performs the process in step S10.

When the abnormality measure calculation unit 203 determines that the abnormality measure calculation in the entire vector does not end in step S9, the reference vector calculation unit 202 focuses on the next characteristic vector (step S10). Then, the reference vector calculation unit 202 performs the process in step S6.

When the abnormality measure calculation unit 203 determines that the abnormality measure calculation in the entire vector ends in step S9, the threshold value calculation unit 204 calculates the threshold value based on the calculated abnormality measure (step S11). Subsequently, the process of the flowchart ends.

The processes of the steps illustrated in FIG. 6 will be described in detail.

In step S2, the characteristic vector extraction unit 201 performs a canonical process on each sensor signal. For example, the characteristic vector extraction unit 201 converts the sensor signal so that the average becomes 0 and the variance becomes 1 by using the average and a standard deviation during a predetermined period. For example, the characteristic vector extraction unit 201 stores the average and the standard deviation of the sensor signals in a storage device so that the same conversion may be performed in the diagnosis of the abnormality sign. Alternatively, for example, the characteristic vector extraction unit 201 may convert the sensor signal so that the maximum value becomes 1 and the minimum value becomes 0 by using the maximum value and the minimum value of the sensor signals during a predetermined period. Further, the characteristic vector extraction unit 201 may use the upper-limit value and the lower-limit value set in advance instead of the maximum value and the minimum value. The characteristic vector extraction unit 201 stores the maximum value and the minimum value or the upper-limit value and the lower-limit value of the sensor signals in a storage device so that the same conversion may be performed in the diagnosis of the abnormality sign. The canonical process which is performed on the sensor signal is used to simultaneously treat the sensor signals having different units and scales.

In step S3, the characteristic vector extraction unit 201 extracts the characteristic vector every time. The characteristic vector may be the characteristic vector in which the sensor signals subjected to the canonical process are arranged in series. Further, the characteristic vector may set the "window width (3, 5, . . . )×the number of sensors" as the characteristic vector by providing windows of ±1, ±2, . . . for a certain time. In this case, the characteristic vector extraction unit 201 may extract a characteristic indicating a change in time of data. Further, the characteristic vector may be obtained from a frequency element through a discrete wavelet transform (DWT: Discrete Wavelet Transform). Further, in step S3, the characteristic vector extraction unit 201 selects a characteristic. As a minimum process, there is a need to exclude a sensor signal having a very small variance and a monotonically increasing sensor signal. Further, an invalid signal may be omitted by a correlated analysis. In this method, a correlated analysis is performed on multi-dimensional time-series signals. Then, when the signals have extremely high similarity such that a plurality of signals have a correlation value of about 1, it is considered that the signals are redundant. Thus, the redundant signals are deleted from the plurality of signals, and the signals which are not redundant are left. In addition, a sensor signal which is deleted by the user may be designated. Further, a characteristic having a large long-term variation may be considered. When the characteristic having a large long-term variation is used, the number of normal states is increased, and the learned data becomes insufficient. For example, an average and a variance are calculated for each period, and then the long-term variation degree may be estimated by the variation.

In step S4 to step S7, the reference vector calculation unit 202 calculates the reference vector in accordance with, for example, a local sub-space classifier (LSC: Local Sub-space Classifier) or a projection distance method (PDM: Projection Distance Method).

Figure 7:
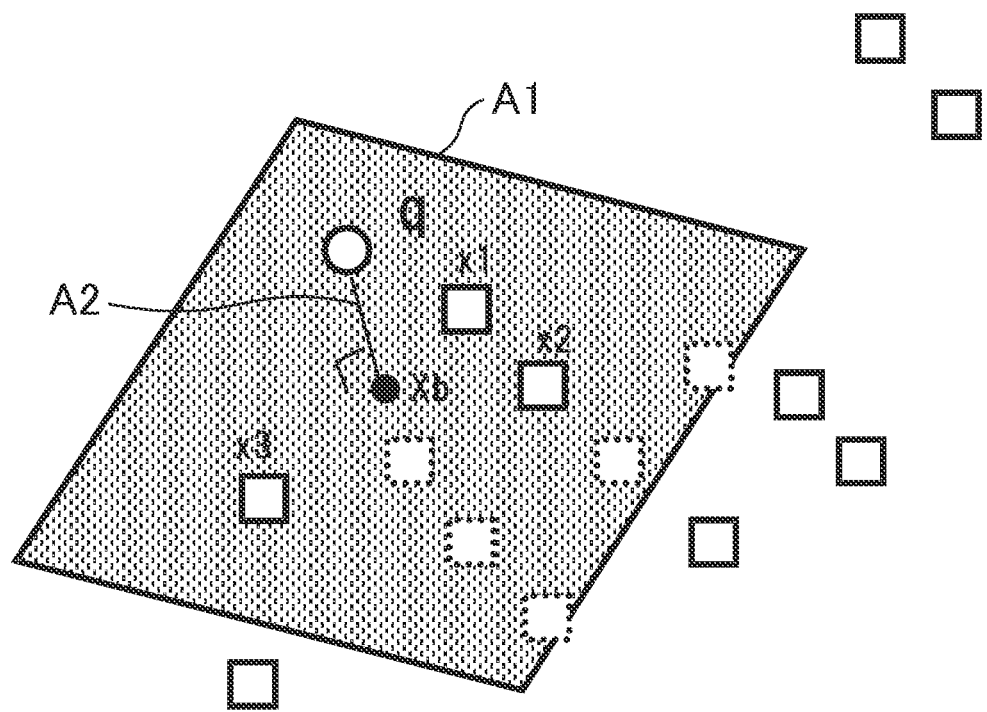
FIG. 7 is a diagram illustrating a local sub-space classifier.

FIG. 7 is a diagram illustrating the local sub-space classifier. The local sub-space classifier is a method of forming a k−1 dimensional affine space A1 by using a k-vicinity vector of a focused vector q. FIG. 7 illustrates an example of the case of k=3. Furthermore, the square indicated by the solid line and the square indicated by the dotted line of FIG. 7 respectively indicate the learned data. The square indicated by the dotted line indicates the learned data (vector) at the side of the affine space A1.

The signs x1 to x3 of FIG. 7 indicate the k-vicinity vector, and illustrate an example of the characteristic vector selected in step S6 of FIG. 6. The designated number is the value of k. As illustrated in FIG. 7, the abnormality measure is expressed by a projection distance A2 illustrated in FIG. 7, and hence a point Xb on the affine space A1 closest to the focused vector q may be obtained. When b is calculated from the evaluation data q and the k-vicinity vector Xi (i=

1, . . . , k), a correlation matrix C expressed by the next equation (1) is obtained from a matrix Q with k number of q and a matrix X with Xi.

[Equation 1]

$$C=(Q-X)^T(Q-X) \quad (1)$$

Then, a linear combination coefficient b is calculated by the following equation (2). Up here, the reference vector of step S7 is calculated.

[Equation 2]

$$b = \frac{C^{-1}1_n}{1_n^T C^{-1} 1_n} \quad (2)$$

Since the abnormality measure d is a distance between q and Xb, the abnormality measure is expressed by the following equation (3).

[Equation 3]

$$d=\|Xb-q\| \quad (3)$$

Furthermore, a case of k=3 has been described in FIG. 5, but the number of k may be a several number when k is sufficiently smaller than the number of dimensions of the characteristic vector. In the case of k=1, a process equivalent to the nearest neighbor method is performed.

The projection distance method is a method of forming a partial space having an individual origin with respect to the selected characteristic vector, that is, an affine space (a space having a maximum variance). The number designated in step S6 may be a several number. However, when the number is too large, it takes time to select the vector and calculate the partial space. Thus, the number may be several tens to several hundreds. The affine space calculation method will be described. First, the average μ and a covariance matrix Σ of the selected characteristic vector are obtained, and the characteristic value of Σ is solved. Then, a matrix U in which a characteristic vector is arranged so as to correspond to r number of characteristic values in order from a large value is set as the orthogonal base of the affine space. The sign r is set as a number smaller than the dimension of the characteristic vector and smaller than the number of the selection data. Alternatively, r may not be set to a fixed number, and may be set to a value when a contribution ratio accumulated in order from the large characteristic value exceeds a predetermined ratio. The abnormality measure is set as the projection distance of the focused vector with respect to the affine space.

In addition, a Gaussian Process or a local average distance method may be used in which the distance to the average vector of the k-vicinity vector of the focused vector q is set as the abnormality measure.

A method of setting the threshold value in step S11 will be described. The threshold value calculation unit 204 sorts the abnormality measure of the entire characteristic vector of the learning period in ascending order and obtains a value in which the ratio becomes about 1. The threshold value calculation unit 204 calculates the threshold value by a process in which an offset is added from the obtained value an integer times. When the offset is 0 and the multiplying factor is 1, the obtained value becomes the threshold value. Although not illustrated in the drawings, the calculated threshold value is stored while being correlated with the learned data.

As described above, it is possible to calculate the highly precise abnormality measure based on an appropriate reference even in the facility in which the state changes complexly by generating the reference vector using the vicinity vector of the focused vector. Since the threshold value as calculated based on the abnormality measure calculated by the cross validation of the learned data, an erroneous report may be suppressed.

The process sequence in the abnormality detection phase of the abnormality sign detection unit 103 will be described.

Figure 8:
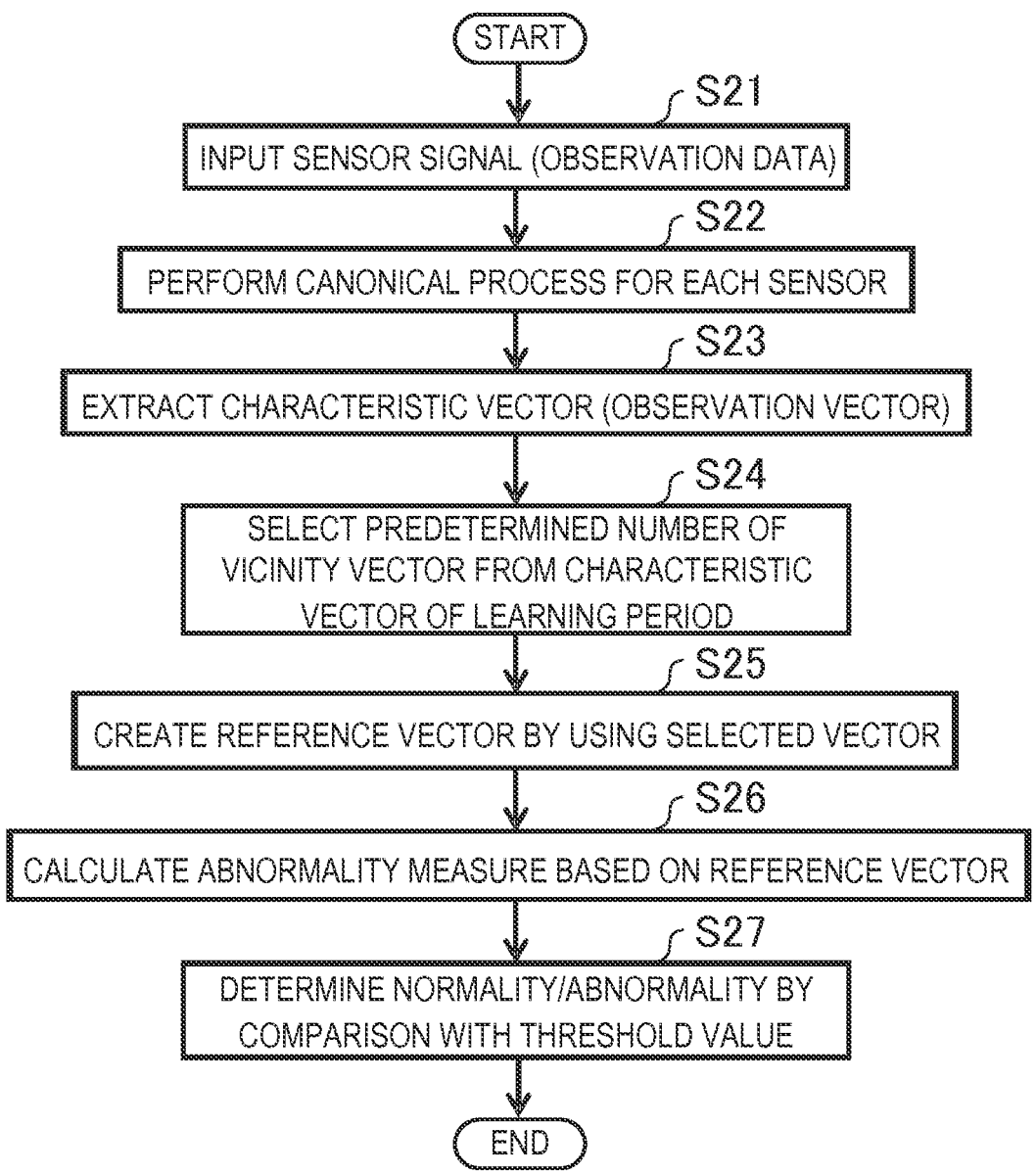
FIG. 8 is a flowchart illustrating a process sequence in an abnormality detection phase of the abnormality sign detection unit.

FIG. 8 is a flowchart illustrating the process sequence in the abnormality detection phase of the abnormality sign detection unit 103. The abnormality sign detection unit 103 performs the processes of the flowchart of FIG. 8 in response to, for example, the abnormality detection instruction of the user.

First, the characteristic vector extraction unit 201 inputs a sensor signal of the diagnosis target from the facility 12 or the operation information DB 101 (step S21).

Next, the characteristic vector extraction unit 201 performs a canonical process on each input sensor signal (step S22).

Next, the characteristic vector extraction unit 201 extracts the characteristic vector from the sensor signal subjected to the canonical process in step S22 (step S23). The characteristic vector extraction unit 201 performs a canonical process on the sensor signal by using the parameter used for the canonical process of the learned data similarly to the process of step S2 of FIG. 6 and extracts the characteristic vector similarly to the process of step S3 of FIG. 6. Thus, the characteristic vector extraction unit 201 selects the same characteristic when the characteristic is selected in step S3. Here, the extracted characteristic vector is referred to as the observation vector so as to be distinguished from the learned data.

Next, the reference vector calculation unit 202 selects a predetermined number of the characteristic vector in order close to the observation vector among the characteristic vector of the learned data (step S24).

Next, the reference vector calculation unit 202 generates the reference vector by using the characteristic vector selected in step S24 (step S25).

Next, the abnormality measure calculation unit 203 calculates the abnormality measure based on the distance to the reference vector of the observation vector (step S26).

Next, the abnormality detection unit 205 compares the threshold value calculated in the learning phase with the abnormality measure calculated in step S26. Then, the abnormality sign is determined when the abnormality measure calculated in step S26 is larger than the threshold value, and the normality is determined otherwise (step S27). Subsequently, the process of the flowchart ends.

The phenomenon pattern extraction unit 104 will be described in detail.

Figure 9:
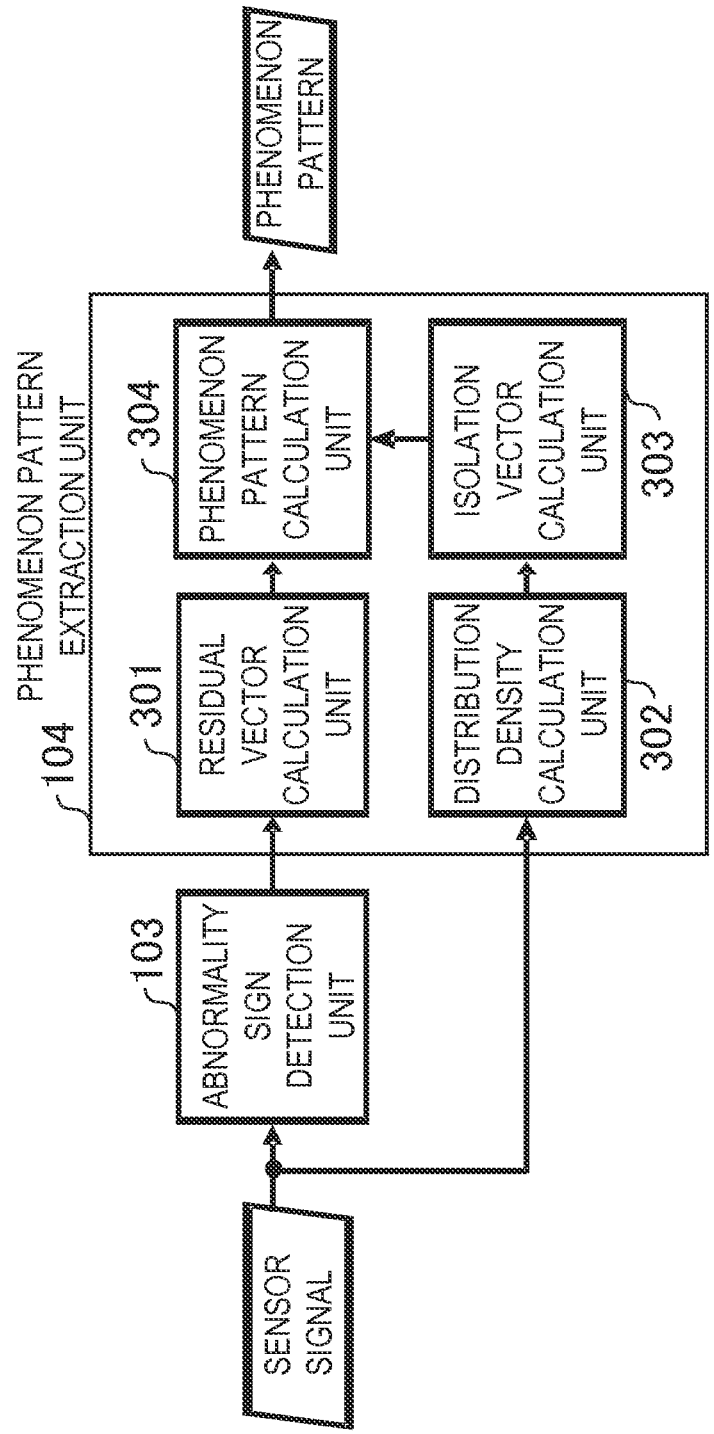
FIG. 9 is a diagram illustrating an example of a specific function block of a phenomenon pattern extraction unit.

FIG. 9 is a diagram illustrating a specific function block of the phenomenon pattern extraction unit 104. As illustrated in FIG. 9, the phenomenon pattern extraction unit 104 includes a residual vector calculation unit 301, a distribution density calculation unit 302, an isolation vector calculation unit 303, and a phenomenon pattern calculation unit 304. FIG. 9 also illustrates the abnormality sign detection unit 103.

The residual vector calculation unit 301 calculates a difference between the observation vector and the reference vector of the process of the abnormality sign detection unit 103.

The distribution density calculation unit 302 calculates two-dimensional distribution density of the learned data of two sensor signals.

The isolation vector calculation unit 303 calculates the isolation of the sensors of the evaluation data based on the distribution density calculated by the distribution density calculation unit 302.

The phenomenon pattern calculation unit 304 calculates the phenomenon pattern based on the residual vector calculated by the residual vector calculation unit 301 and the isolation vector calculated by the isolation vector calculation unit 303.

In the operation of the phenomenon pattern extraction unit 104, there are two phases of the "learning phase" and the "abnormality detection phase" in accordance with the operation of the abnormality sign detection unit 103. The phenomenon pattern extraction unit 104 calculates the distribution density in the distribution density calculation unit 302 in the "learning phase". In the "abnormality detection phase", the residual vector calculation unit 301 calculates the residual vector, the isolation vector calculation unit 303 calculates the isolation vector, and the phenomenon pattern calculation unit 304 calculates the phenomenon pattern.

Figure 10:
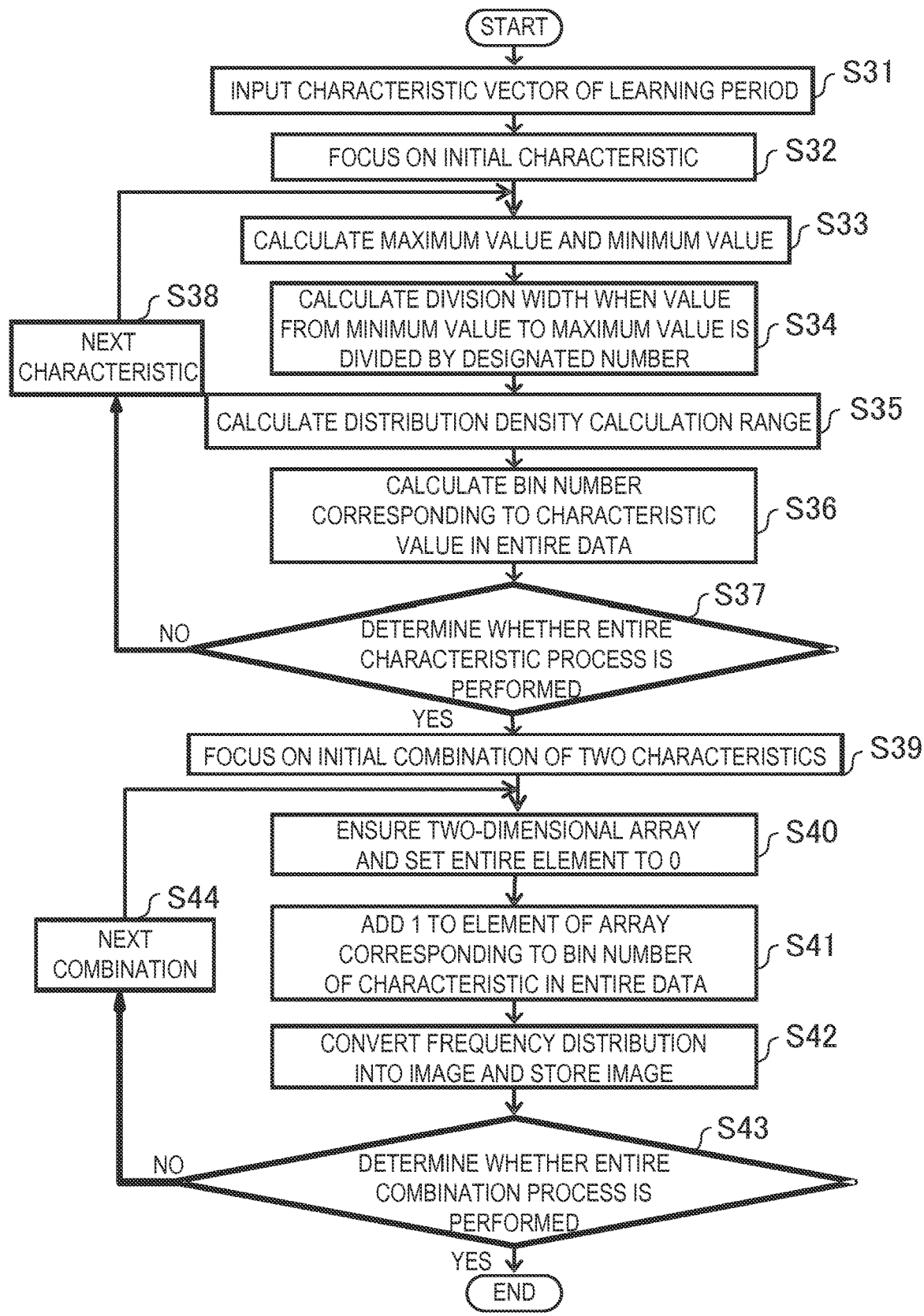
FIG. 10 is a flowchart illustrating a process sequence in a learning phase of a distribution density calculation unit.

FIG. 10 is a flowchart illustrating a process sequence in the learning phase of the distribution density calculation unit 302. The distribution density calculation unit 302 performs the process of the flowchart of FIG. 10 in response to, for example, the user's learning instruction.

First, the distribution density calculation unit 302 inputs the characteristic vector of the learning period (step S31).

Next, the distribution density calculation unit 302 focuses on the initial characteristic (step S32). The initial characteristic is the initial element of the characteristic vector and corresponds to, for example, the row of the sensor 1 illustrated in FIG. 3.

Next, the distribution density calculation unit 302 obtains the maximum value (MAX) and the minimum value (MIN) in the focused characteristic (step S33).

Next, the distribution density calculation unit 302 calculates the division width S when the value from the minimum value to the maximum value is divided by the designated number N (step S34). The width S may be calculated by "S=(MAX−MIN)/N".

Next, the distribution density calculation unit 302 calculates the distribution density calculation range by widening the range outward from the minimum value and the maximum value (step S35). In the widening range, for example, MIN is changed to "MIN−S×M", and MAX is changed to "MAX+S×M". Here, M is set to a predetermined integer of 1 or more.

Next, the distribution density calculation unit 302 calculates a bin number (BNO) corresponding to a characteristic value (a focused characteristic value) for the entire data of the learning period (step S36). The bin number may be calculated by BNO=INT((F−MIN)/(MAX−MIN)). However, INT(X) indicates an integer part of X.

Next, the distribution density calculation unit 302 determines whether to perform the processes of step S33 to step S36 in the entire characteristic (step S37). The distribution density calculation unit 302 performs the process of step S39 when the processes of step S33 to step S36 are performed in the entire characteristic. The distribution density calculation unit 302 performs the process of step S38 when the processes of step S33 to step S36 when the process is not performed in the entire characteristic.

The distribution density calculation unit 302 focuses on the next characteristic when it is determined that the processes of step S33 to step S36 are not performed in the entire characteristic in step S37 (step S38). Then, the distribution density calculation unit 302 performs the process of step S33.

The distribution density calculation unit 302 focuses on the combination of two initial characteristics when it is determined that the processes of step S33 to step S36 are performed in the entire characteristic in step S37 (step S39). Two characteristics may be the same.

Next, the distribution density calculation unit 302 ensures a two-dimensional array for calculating the distribution density, and sets the entire element to "0" (step S40). The size of the array is N+2M.

Next, the distribution density calculation unit 302 adds 1 to the element of the array corresponding to the bin numbers of two characteristics in the entire data of the learned data (step S41). By this process, a two-dimensional frequency distribution (histogram) is calculated by two characteristics.

Next, the distribution density calculation unit 302 converts the frequency distribution calculated in step S41 into an image and stores the image (step S12). The conversion method will be described later.

Next, the distribution density calculation unit 302 determines whether the processes of step S40 to step S42 are performed in the combination of two characteristics (step S43). The distribution density calculation unit 302 ends the distribution density calculation process when the processes of step S40 to step S42 are performed in the combination of the entire characteristic. The distribution density calculation unit 302 performs the process of step S44 when the processes of step S40 to step S42 are not performed in the combination of the entire characteristic.

The distribution density calculation unit 302 focuses on the next combination when it is determined that the processes of step S40 to step S42 are not performed in the combination of the entire characteristic in step S43 (step S44).

Furthermore, although not illustrated in the drawings, the distribution density calculation unit 302 stores the size of the two-dimensional array and the minimum value and the maximum value of the characteristics calculated in step S35 in a storage device.

An example of the image conversion method in step S42 will be described. First, the distribution density calculation unit 302 obtains the maximum value, that is, the maximum frequency of the array element. The image size is set to be equal to the array size, and the pixel value of the coordinate corresponding to the value of each element is set to, for example, the element values of the array of 255/the maximum frequency. 255 indicate the maximum value when the pixel value is indicated by 8 bits, and the image may be stored in a bitmap format when the value is used. Alternatively, the pixel value is set to 255×LOG (the element value of the array+1)/LOG (the maximum frequency+1). Here, LOG(X) indicates The log of X. If the conversion equation is used, even when the maximum frequency is large, the nonzero pixel value may correspond to the nonzero frequency.

Since the image obtained by the above-described process is indicated by the pixel value which is large in the high-density point in the two-dimensional characteristic space, the image is referred to as the distribution density image.

Figure 11:
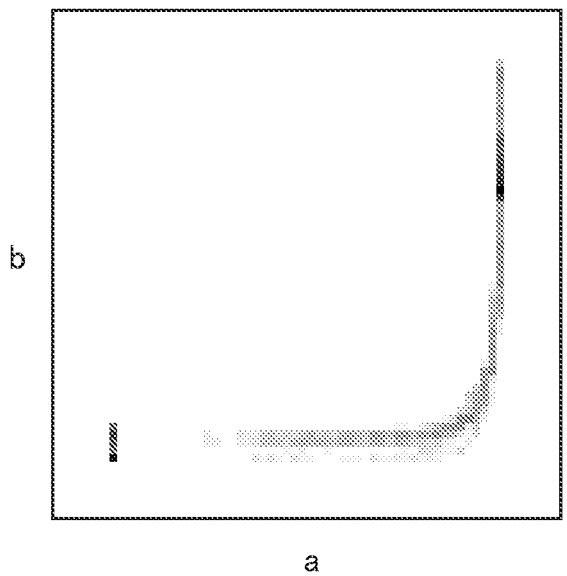
FIG. 11 is a diagram illustrating an example of a distribution density image.

FIG. 11 is a diagram illustrating an example of the distribution density image. FIG. 11 illustrates the two-dimensional distribution density of the sensors a and b. In FIG. 11, an image of a gray scale is illustrated in which the pixel value "0" is indicated by white and the pixel value "255" is indicated by black.

The image creation method is not limited to the above-described method. For example, the distribution density calculation unit 302 may not use a simple frequency distribution, but may allocate a Gauss distribution or a weighted filter to one data in a superimposed manner. Alternatively, the distribution density calculation unit 302 may apply a maximum value filter of a predetermined size, an average filter, or the other weighted filters on the image obtained by the above-described method. Further, the two-dimensional distribution density may not be essentially stored in an image format and the two-dimensional array may be stored in a text format.

The residual vector calculation unit 301 in the abnormality detection phase will be described in detail. The residual vector is a difference between the observation vector in step S23 of FIG. 8 and the reference vector in step S25. The residual vector calculation unit 301 may square each element so that all elements become positive. Further, in step S3 of FIG. 6, when the windows of ±1, ±2, . . . are provided, the windows may be grouped for each sensor by adding the windows by the window width. The residual vector indicates the contribution degree of each sensor in the abnormality measure.

The isolation vector calculation unit 303 in the abnormality detection phase will be described in detail.

Figure 12:
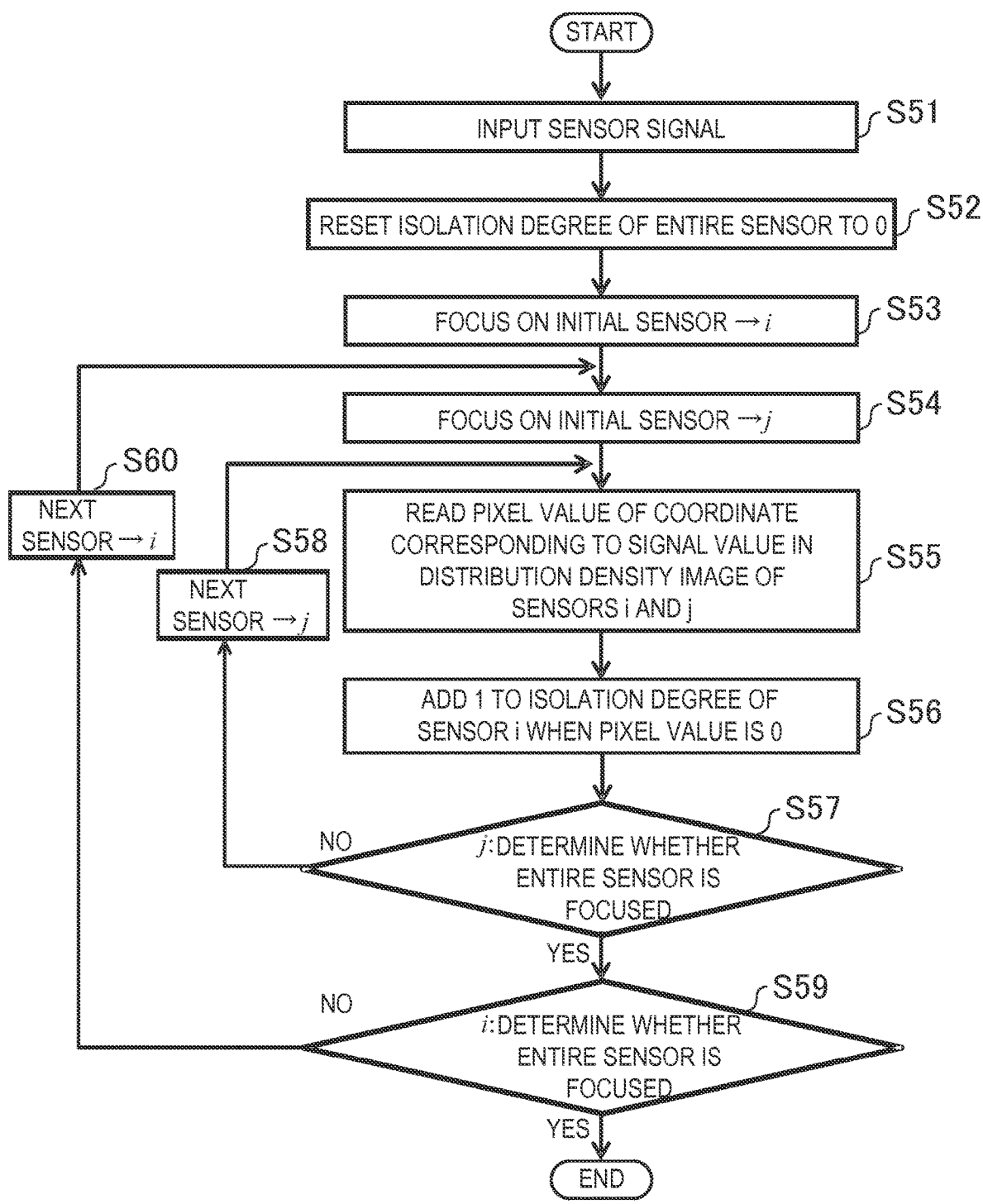
FIG. 12 is a flowchart illustrating a process sequence in an abnormality detection phase of the isolation vector calculation unit.

FIG. 12 is a flowchart illustrating a process sequence in the abnormality detection phase of the isolation vector calculation unit 303. The isolation vector calculation unit 303 performs the process of the flowchart of FIG. 12 in response to, for example, the abnormality detection instruction of the user.

First, the isolation vector calculation unit 303 inputs the sensor signal of the diagnosis target from the facility 12 or the operation information DB 101 (step S51).

Next, the isolation vector calculation unit 303 resets the isolation degrees of all sensors to 0 (step S52).

Next, the isolation vector calculation unit 303 focuses on the initial sensor and sets the sensor as a sensor i (step S53).

Next, the isolation vector calculation unit 303 focuses on the initial sensor and sets the sensor as a sensor j (step S54).

Next, the isolation vector calculation unit 303 reads the pixel values of the coordinates corresponding to the signal values of the sensors i and j in the distribution density image of the sensors i and j (step S55).

Next, the isolation vector calculation unit 303 adds 1 to the isolation degree of the sensor i when the pixel value is "0" (step S56).

Next, the isolation vector calculation unit 303 determines whether all sensors are focused in the sensor j (step S57). The isolation vector calculation unit 303 performs the process of step S59 when all sensors are focused in the sensor j. The isolation vector calculation unit 303 performs the process of step S58 when all sensors are focused in the sensor j.

The isolation vector calculation unit 303 sets the next sensor as the sensor j when it is determined that all sensors are not focused in the sensor j in step S57 (step S58). Then, the isolation vector calculation unit 303 performs the process of step S55.

The isolation vector calculation unit 303 determines whether all sensors are focused in the sensor i when it is determined that all sensors are focused in the sensor j in step S57 (step S59). The isolation vector calculation unit 303 ends the isolation vector calculation process when all sensors are focused in the sensor i. The isolation vector calculation unit 303 performs the process of step S60 when all sensors are not focused in the sensor i.

The isolation vector calculation unit 303 sets the next sensor as the sensor i when it is determined that all sensors are not focused in the sensor i in step S59 (step S60).

By this process, the isolation for each time is calculated for the sensors. The isolation degree increases when the signal value of the sensor corresponding to the two-dimensional distribution does not exist in the learned data. The isolation vector calculation unit 303 groups the isolation degrees of the sensors in all sensors so that the group becomes the isolation vector.

The phenomenon pattern calculation unit 304 in the abnormality detection phase will be described in detail. The residual vector and the isolation vector are calculated every time. The phenomenon pattern calculation unit 304 integrates the residual vector and the isolation vector calculated above in the time direction so that the integration becomes the phenomenon pattern. The integration time is set as the abnormality sign detection period or the period which is earlier by a predetermined time than the abnormality detection time. In the embodiment, the residual vector and the isolation vector are used together, but any one of them may be used. Since it is thought that the residual vector and the isolation vector are largely changed by the failure mode, the residual vector and the isolation vector may be effectively used to estimate the maintenance work content.

Another phenomenon pattern extraction operation of the phenomenon pattern extraction unit 104 will be described.

Figure 13A:
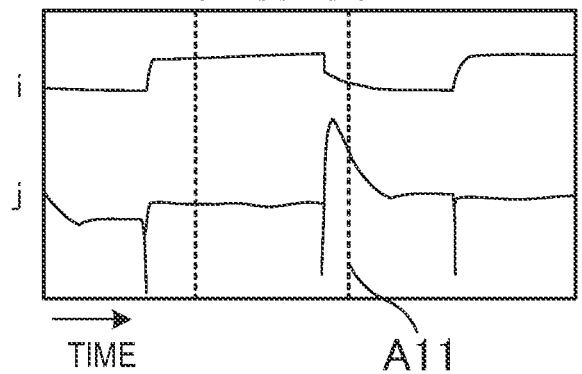
FIGS. 13A, 13B, and 13C are diagrams illustrating another phenomenon pattern extraction operation example of the phenomenon pattern extraction unit.
Figure 13B:
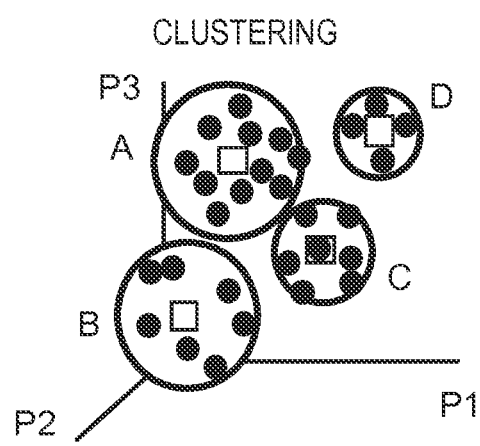
Figure 13C:
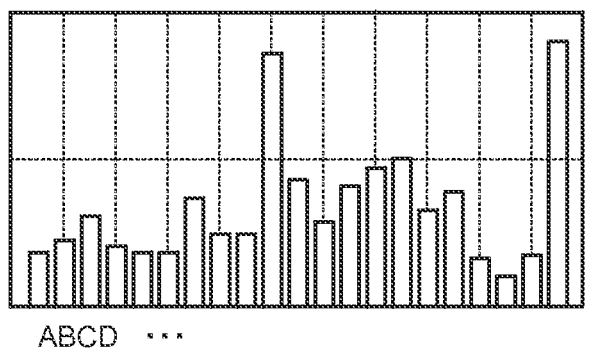

FIGS. 13A, 13B, and 13C are diagrams illustrating another phenomenon pattern extraction operation example of the phenomenon pattern extraction unit 101. In the example of FIGS. 13A, 13B, and 13C, the phenomenon pattern extraction unit 104 converts the sensor signal into a low-dimensional histogram characteristic by a method called bag-of-features (BOF) so that the sensor signal becomes the phenomenon pattern. Furthermore, FIG. 13A illustrates an example of the sensor signals of the sensors i and j.

The phenomenon pattern extraction unit 104 prepares many vectors in which all sensor values are arranged every time by using the past sensor signals. A cluster classification reference is created by performing a clustering without a teacher such as a k-means method. When the phenomenon pattern is extracted, for example, the phenomenon pattern extraction unit 104 segments the sensor signal during a period which is earlier by a predetermined time than the abnormality detection time as illustrated in a dotted-line area A11 of FIG. 13A, cluster-classifies the characteristic vector of each time as illustrated in FIG. 13B, and calculates the histogram of the classification result as illustrated in FIG. 13C. The histogram becomes a characteristic in which the sensor signal state and the change thereof are summarized, and hence the related maintenance work content is effectively estimated. Furthermore, P1 to P3 of FIG. 13B indicates the dimensions, and correspond to the number of the sensors. Further, the circle of FIG. 13B indicates the characteristic vector of a time, and the square indicates the center of the clustering. Further, the histogram of FIG. 13C indicates the phenomenon pattern of the sensor signal of the dotted-line area A11 of FIG. 13A.

The related information correlation unit 105 will be described in detail. The related information correlation unit 105 correlates the past sensor signal stored in the operation information DB 101 in the diagnosis model creation phase with the maintenance history information stored in the maintenance history information DB 102.

FIG. 14 is a diagram illustrating a correlation between the sensor signal and the maintenance history information. When the alarm information leading to the maintenance work is included in the maintenance history information of the maintenance history information DB 102, the related information correlation unit 105 segments and correlates the sensor signals at a time earlier than a predetermined period from the time of the alarm closest to the work date.

For example, it is assumed that the alarm information leading to the maintenance work M1 is included in the maintenance history information of the maintenance history information DB 102 and the generation time is t1. In this case, as illustrated in FIG. 14, the related information correlation unit 105 extracts the sensor signal group g1 obtained earlier by a predetermined period than the alarm time t1 from the operation information DB 101 and correlates the sensor signal group with the maintenance work M1.

Furthermore, FIG. 14 illustrates the phenomenon patterns P1, . . . , Pn which are extracted from the sensor signal groups g1, . . . , gn by the phenomenon pattern extraction unit 104. That is, the phenomenon pattern extraction unit 104 extracts the phenomenon pattern of the sensor signal group correlated by the maintenance history information.

In the above-described configuration, the maintenance work is correlated with the sensor signal, but the alarm generation time may be correlated with the sensor signal.

Further, when the alarm generation date is not stored in the maintenance history information DB 102 and the maintenance work date is stored in the maintenance history information DB 102, the related information correlation unit 105 may segment and correlate the sensor signals which are earlier by a predetermined period than the maintenance work date.

The work keyword extraction unit 106 will be described in detail. The work keyword extraction unit 106 is operated in the diagnosis model creation phase and is not operated in the maintenance work suggestion phase.

Figure 15B:
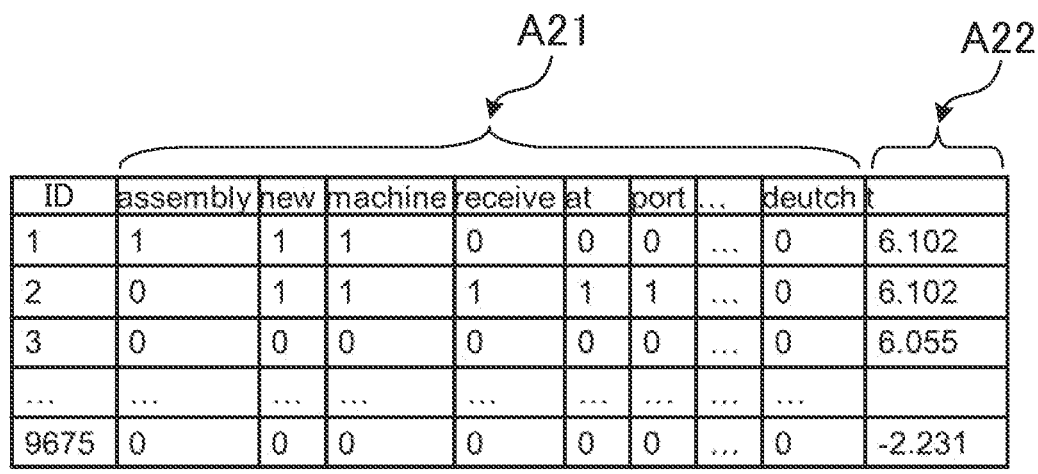

FIGS. 15A, 15B, and 15C are diagrams illustrating the extraction of the work keyword. As illustrated in FIG. 15A, the work keyword extraction unit 106 extracts a maintenance work report (a document of FIG. 15A) and a cost from the maintenance history information DB 102. The work keyword extraction unit 106 adds ID to the extracted text. For example, the ID exists as many as the maintenance work report.

The work keyword extraction unit 106 examines the appearing words based on the extracted document and converts the existence of the word of each document into the vector expressed by "0" or "1" as indicated by the arrow A21 of FIG. 15B. Further, the work keyword extraction unit 106 sets the cost as the correlated value as indicated by the arrow A21 of FIG. 15B. The work keyword extraction unit 106 calculates the important degree of each word by analyzing the relation between the vector indicated by the arrow A21 and the correlated value indicated by the arrow A22, and creates a dictionary with an important degree as illustrated in FIG. 15C.

As the analysis method, there are known a method of directly calculating the important degree of each word and a method of calculating the important degree from the regression coefficient by assuming the regression model from the vector to the correlated value. In the former example, a smoothing average method calculated by the following equation (4) is known.

[Equation 4]

$$p_j = \frac{f \cdot a + \sum_i x_{ij} t_j}{f + \sum_i x_{ij}} \quad (4)$$

Here, pj indicates the important degree of the word j, f indicates the frequency of the virtually increasing vocabulary, and a indicates the center value of the correlated value. The right side of the numerator indicates the sum of the correlated value of the document including the word j, and the right side of the denominator indicates the number of the documents including the word j.

As an example of the method of assuming the regression model, there are known a LASSO regression method, a Supervised Latent Dirichlet Allocation (sLDA) method, and a method obtained by the combination of a singular value decomposition method and a regression method.

By several methods described above, the important keyword may be extracted, and the text with a free description which may not be easily handled may be summarized from the viewpoint of the keyword. For example, the work keyword extraction unit 106 extracts a predetermined number of the work keywords in high order of the important degree by referring to the created dictionary with the important degree. Alternatively, the work keyword extraction unit 106 may extract the work keyword having a predetermined value or more of the important degree.

The cost or the downtime may be considered as the correlated value. Since these information items are closely involved with the maintenance work, there is a high possibility that these information items are stored as the maintenance history information. Further, the information items directly lead to the important degree of the keyword. That is, the failure becomes severe as the cost becomes high or the downtime becomes long. Further, there is a large effect that the maintenance work may be suggested at the time point in which the sign is detected. Further, when the keyword is extracted by using the cost or the downtime as the correlated value, it is possible to suggest the maintenance work and to estimate the cost or the downtime.

Further, the abnormality measure or the accumulation value thereof may be used as the correlated value. In this case, it is possible to extract the keyword involved with the failure in which the abnormality sign is detected based on the sensor signal.

Further, the existence of the specific word may be used as the correlated value. For example, when the existence of the word involved with the treatment such as a "replacement" and an "adjustment" is used, the part name of the replacement target and the unit name of the adjustment target may be extracted.

When a process of excluding a low-frequency word, a process of excluding a word of a predetermined amount, for example, 90% or more in the document, a process of excluding a date, or a process of excluding a company name and a name is performed before the processes are performed, the keyword may be extracted more meaningfully. Of course, the same operation may be performed after the pre-extraction.

The phenomenon pattern classification reference creation unit 107 will be described in detail. The phenomenon pattern classification reference creation unit 107 creates the classification reference for classifying the phenomenon pattern by using the learning method with the teacher. The phenomenon pattern classification reference creation unit 107 creates the classification reference for classifying the phenomenon pattern based on the work keyword included in the maintenance history information correlated with the sensor signal as the source of the phenomenon pattern and the phenomenon pattern extracted by the phenomenon pattern extraction unit 104. Furthermore, the work keyword included in the maintenance history information is extracted by the work keyword extraction unit 106. Further, the phenomenon pattern classification reference creation unit 107 is operated in the diagnosis model creation phase and is not operated in the maintenance work suggestion phase.

First, the phenomenon pattern classification reference creation unit 107 creates the learned data for creating the classification reference by using the result obtained by the related information correlation unit 105. The learned data includes a characteristic amount and a teacher label. The characteristic amount is the phenomenon pattern calculated by the phenomenon pattern extraction unit 104. The teacher label is the work keyword included in the maintenance history information correlated with the sensor signal as the source of the extracted phenomenon pattern.

For example, the phenomenon patterns P1, . . . , Pn illustrated in FIG. 14 becomes the characteristic amount of the learned data. Further, the work keyword which is extracted from the maintenance work report of the maintenance works M1, . . . , Mn corresponding to the sensor signal groups g1, . . . , gn as the sources of the phenomenon patterns P1, . . . , Pn illustrated in FIG. 14 becomes the teacher label of the learned data.

Furthermore, the teacher label may be set such that the combination of the work keywords is coded and is used as the teacher label. When the learning with the teacher is performed by using the input of such learned data, the classification reference for classifying the phenomenon pattern according to the work keyword is created. As the learning method with the teacher, there are known various methods such as an SVM (Support Vector Machine), a determination analysis method, a subspace method, a decision tree method, a Naive Bayes method, and a flexible Naive Bayes method, and any method may be used. In this way, when the phenomenon pattern is classified by using the work keyword as the teacher, the sign is detected and the phenomenon pattern is extracted. Thus, it is possible to suggest the maintenance work having high possibility as the first candidate. On the contrary, when the classification reference of the phenomenon pattern is manually determined, it is difficult to mention that the classification method is effective for estimating the maintenance work. Thus, there is a concern that a plurality of candidates having the same possibility may be suggested.

The phenomenon pattern classification unit 108 classifies the phenomenon pattern extracted in the phenomenon pattern extraction unit 104 according to the classification reference which is created in the phenomenon pattern classification reference creation unit 107. By this process, the label is added to the phenomenon pattern. There is a case in which a label different from the teacher label may be added to the data used for the learning of the phenomenon pattern classification reference creation unit 107. In order to distinguish these labels, the label added herein is referred to as the "diagnosis label".

The diagnosis model creation unit 109 will be described in detail. The diagnosis model creation unit 109 creates the diagnosis model for estimating the work keyword suggested to the maintenance worker based on the work keyword included in the maintenance history information correlated with the sensor signal as the source of the phenomenon pattern and the phenomenon pattern classified by the phenomenon pattern classification unit 108. The diagnosis model creation unit 109 is operated in the diagnosis model creation phase and is not operated in the maintenance work suggestion phase.

FIG. 16 is a diagram illustrating the diagnosis model. The diagnosis model is a matrix in which a work keyword 401 is provided in the horizontal axis and a phenomenon pattern 402 is provided in the vertical axis, and is used to calculate the possibility for the correct treatment for each work keyword 401 in a certain phenomenon pattern. In the example of FIG. 16, the possibility for the combination of a keyword 401$a$ for the treatment and a keyword 401$b$ for a treatment target is calculated.

The combination of the keywords 401$a$ and 401$b$ corresponds to the "teacher label" used in the phenomenon pattern classification unit 108. The classification method of the phenomenon pattern 402 is based on the "diagnosis label" added in the phenomenon pattern classification unit 108. For example, the type A, the type B, and the like illustrated in the phenomenon pattern 402 of FIG. 16 are names respectively corresponding to the diagnosis labels.

In order to create the diagnosis model, the diagnosis model creation unit 109 first prepares a two-dimensional matrix having the number of items provided in the horizontal axis and the vertical axis, and resets all elements to 0. Since the horizontal axis corresponds to the teacher label and the vertical axis corresponds to the diagnosis label, the number of items of the horizontal axis and the vertical axis are basically the same. The diagnosis model creation unit 109 counts up the intersection element of the diagnosis label and the teacher label in the data used for the learning of the phenomenon pattern classification reference creation unit 107. When a process is performed on the entire data, the two-dimensional frequency distribution may be obtained. All elements are classified by the sum in the horizontal direction and are stored as the possibility. In this way, when the diagnosis model is created, the other possibilities may be illustrated without being narrowed down to one maintenance work in a certain diagnosis label, and hence an error may be reduced.

The maintenance work suggestion unit 110 extracts and suggests the work keyword suggested to the maintenance worker by referring to the diagnosis model created in the diagnosis model creation unit 109 based on the phenomenon pattern classified by the phenomenon pattern classification unit 108. For example, the maintenance work suggestion unit 110 obtains the possibility of the work keyword by referring to the diagnosis model based on the diagnosis label obtained in the phenomenon pattern classification unit 108 in the maintenance work suggestion phase and suggests the maintenance work of which the possibility is not zero in high-possibility order.

Figure 17:
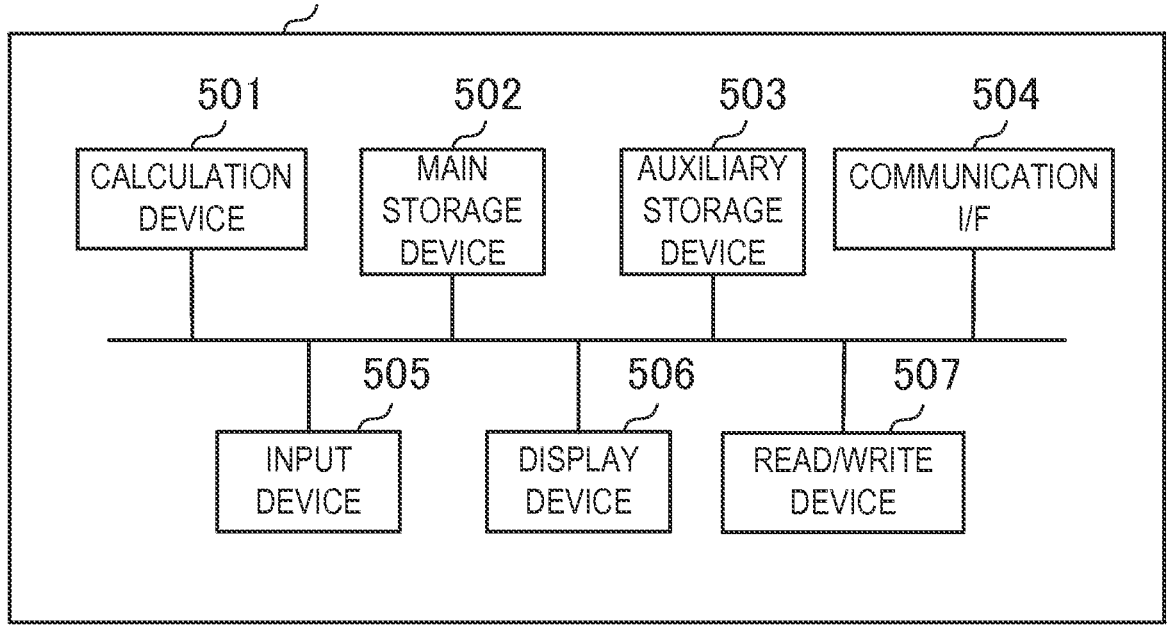
FIG. 17 is a diagram illustrating a hardware configuration example of the information processing apparatus.

FIG. 17 is a diagram illustrating a hardware configuration example of the information processing apparatus 11. For example, as illustrated in FIG. 17, the information processing apparatus 11 may be realized by a calculation device 501 such as a CPU (Central Processing Unit), a main storage device 502 such as a RAM (Random Access Memory), an auxiliary storage device 503 such as an HDD (Hard Disk Drive), a communication interface (I/F) 504 which is used to connect to a communication network in a wired or wireless manner, an input device 505 such as a mouse, a keyboard, a touch sensor, or a touch panel, a display device 506 such as a liquid crystal display, and a read/write device 507 which reads and writes information from and into a portable storage medium such as a DVD (Digital Versatile Disk).

For example, the functions of the abnormality sign detection unit 103, the phenomenon pattern extraction unit 104, the related information correlation unit 105, the work keyword extraction unit 106, the phenomenon pattern classification reference creation unit 107, the phenomenon pattern classification unit 108, the diagnosis model creation unit 109, and the maintenance work suggestion unit 110 of FIG. 2 are realized in a manner such that the calculation device 501 executes a predetermined program loaded from the auxiliary storage device 503 or the like into the main storage device 502. The operation information DB 101 and the maintenance history information DB 102 are realized, for example, in a manner such that the calculation device 501 uses the main storage device 502 or the auxiliary storage device 503. The communication of the information processing apparatus 11 is realized, for example, in a manner such that the calculation device 501 uses the communication I/F 504.

Furthermore, the predetermined program may be installed from the storage medium read by, for example, the read/write device 507 or may be installed from the network via the communication I/F 504.

Further, a part or the entirety of the functions of the information processing apparatus 11 may be realized by, for example, a controller board including an ASIC (Application Specific Integrated Circuit) with a calculation device, a storage device, a driving circuit, and the like.

Further, the functional configuration of the information processing apparatus 11 is divided in response to the main process content in order to easily understand the configuration of the information processing apparatus 11. The invention is not limited to the method of dividing the components or the name thereof. The configuration of the information processing apparatus 11 may be divided into many components in response to the process content. Further, one component may be divided so that the more processes may be performed. Further, the processes of the components may be performed by single hardware or a plurality of hardware.

Further, the process unit of the above-described flowchart is obtained by the division in response to the main process content in order to easily understand the process of the information processing apparatus 11. The invention is not limited to the process unit division method or the name. The process of the information processing apparatus 11 may be divided into many process units in response to the process content. Further, the process may be divided so that one process unit includes many processes.

In this way, according to the first embodiment, since the information processing apparatus 11 extracts the keyword involved with the work based on the text data having a free description included in the maintenance history information, the maintenance history information may be summarized based on the keyword, and hence the text information which is not easily treated may be effectively utilized. Further, since the information processing apparatus 11 extracts the phenomenon pattern from the sensor signal and divides the sensor data from the viewpoint of the work content so as to create the diagnosis model, the highly precise diagnosis model may be created, and hence the facility 12 may be accurately diagnosed. Further, since the information processing apparatus 11 detects the abnormality sign and extracts the phenomenon pattern so as to suggest the maintenance work by using the diagnosis model, a system that suggests the maintenance work content at the step of the sign may be realized.

Furthermore, the data as the diagnosis target is not the current sensor signal, but may be the past sensor signal stored in, for example, the operation information DB 101. For example, the diagnosis may be performed by detecting the abnormality sign of the facility during a predetermined past period.

Further, the operation information DB 101 and the maintenance history information DB 102 may be realized by an external device of the information processing apparatus 11. For example, the operation information DB 101 and the maintenance history information DB 102 may be realized by a storage device connected to the network 14.

Further, when a plurality of the facilities 12 exist in accordance with the model or the machine, the information processing apparatus 11 may create the diagnosis model in accordance with the model or the machine. Then, the information processing apparatus 11 may detect and diagnose the abnormality sign of the facility 12 in accordance with the model or the machine. For example, the related information correlation unit 105 correlates the sensor signal with the maintenance history information in accordance with the model or the machine, and the diagnosis model creation unit 109 creates the diagnosis model in accordance with the model or the machine.

Further, the abnormality sign detection unit 103 detects the abnormality sign from the sensor signal, but may detect the abnormality. For example, the abnormality sign detection unit 103 may calculate a threshold value used to determine whether the sensor signal is abnormal.

Second Embodiment

Next, a second embodiment will be described. In the first embodiment, the abnormality is detected based on the sensor signal output from the facility, and the abnormality is diagnosed by using the past maintenance history information. However, in the second embodiment, the abnormality is diagnosed by also using the event signal out but from the facility.

Figure 18:
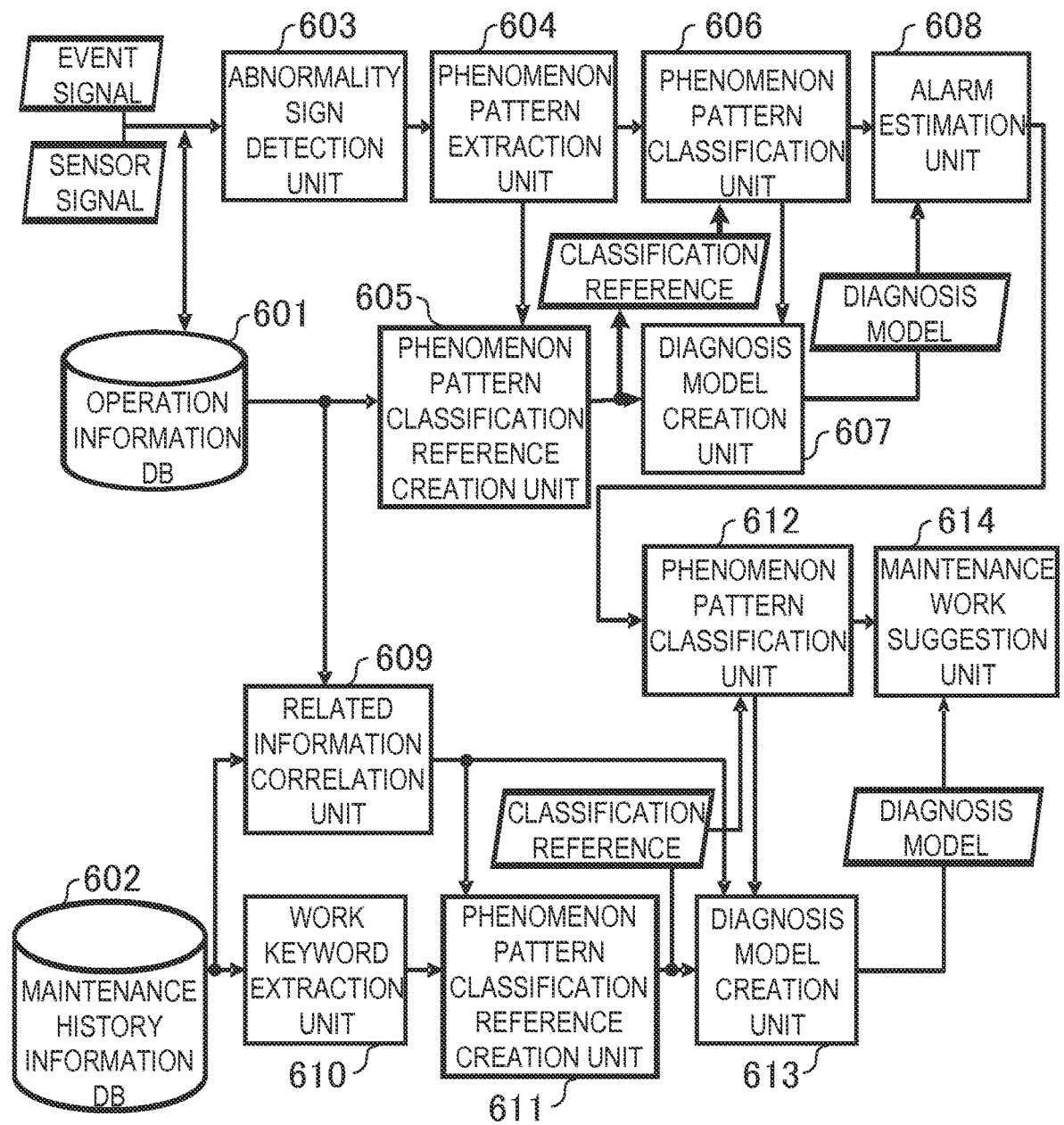
FIG. 18 is a diagram illustrating an example of a function block of the information processing apparatus according to a second embodiment.

FIG. 18 is a diagram illustrating a function block of the information processing apparatus 11 according to the second embodiment. As illustrated in FIG. 18, the information processing apparatus 11 includes an operation information DB 601, a maintenance history information DB 602, an abnormality sign detection unit 603, a phenomenon pattern extraction unit 604, phenomenon pattern classification reference creation units 605 and 611, phenomenon pattern classification units 606 and 612, diagnosis model creation units 607 and 613, an alarm estimation unit 608, a related information correlation unit 609, a work keyword extraction unit 610, and a maintenance work suggestion unit 614.

The operation information DB 601 stores the sensor signal and the event signal output from the facility 12.

The maintenance history information DB 602 stores information involved with the maintenance of the facility 12.

The abnormality sign detection unit 603 detects the abnormality sign of the facility 12 based on the sensor signal.

The phenomenon pattern extraction unit 604 extracts the phenomenon pattern from the sensor signal.

The phenomenon pattern classification reference creation unit 605 creates the classification reference for classifying the phenomenon pattern by using the alarm included in the event signal as the teacher. For example, the alarm included in the event signal may indicate a decrease in oil pressure, a decrease in water pressure, a water temperature, a start delay, and the like of the facility 12.

The phenomenon pattern classification unit 606 classifies the phenomenon pattern extracted from the sensor signal based on the classification reference created by the phenomenon pattern classification reference creation unit 605.

The diagnosis model creation unit 607 creates the diagnosis model for estimating the alarm from the phenomenon pattern classification result.

The alarm estimation unit 608 estimates the alarm by using the phenomenon pattern classification result and the diagnosis model.

The related information correlation unit 609 correlates the sensor signal with the maintenance history information.

The work keyword extraction unit 610 extracts the work keyword from the maintenance work report as the text data and the correlated value thereof.

The phenomenon pattern classification reference creation unit 611 creates the classification reference for classifying the phenomenon pattern by using the work keyword as the teacher every alarm.

The phenomenon pattern classification unit 612 classifies the phenomenon pattern extracted from the sensor signal based on the classification reference created by the phenomenon pattern classification reference creation unit 611.

The diagnosis model creation unit 613 creates the diagnosis model for estimating the work keyword suggested to the maintenance worker from the phenomenon pattern classification result every alarm.

The maintenance work suggestion unit 614 estimates the work keyword for suggesting the maintenance work content to the maintenance worker by using the phenomenon pattern classification result and the diagnosis model created by the diagnosis model creation unit 613, and suggests the maintenance work candidate based on the work keyword.

The operation information DB 601, the maintenance history information DB 602, the related information correlation unit 609, the work keyword extraction unit 610, the phenomenon pattern classification reference creation unit 611, the phenomenon pattern classification unit 612, the diagnosis model creation unit 613, and the maintenance work suggestion unit 614 illustrated in FIG. 18 correspond to the operation information DB 101, the maintenance history information DB 102, the related information correlation unit 105, the work keyword extraction unit 106, the phenomenon pattern classification reference creation unit 107, the phenomenon pattern classification unit 108, the diagnosis model creation unit 109, and the maintenance work suggestion unit 110 illustrated in FIG. 2. However, the operation information DB 601, the maintenance history information DB 602, the related information correlation unit 609, the work keyword extraction unit 610, the phenomenon pattern classification reference creation unit 611, the phenomenon pattern classification unit 612, the diagnosis model creation unit 613, and the maintenance work suggestion unit 614 illustrated in FIG. 18 are different from those of FIG. 2 in that the classification reference and the diagnosis model are created every alarm. For example, the information processing apparatus 11 illustrated in FIG. 18 creates the classification reference and the diagnosis model described in the first embodiment every alarm involved with a decrease in oil pressure, a decrease in water pressure, a water temperature, and a start delay. Further, the information processing apparatus 11 illustrated in FIG. 18 classifies the phenomenon pattern of the sensor signal by the classification reference (the classification reference classified by the phenomenon pattern classification reference creation unit 605) created by using the alarm as the teacher, and suggests the maintenance work by referring to the diagnosis model created by the diagnosis model creation unit 613 based on the classified phenomenon pattern.

In the operation of the information processing apparatus 11 illustrated in FIG. 18, there are two phases of a "diagnosis model creation phase" that creates the diagnosis model by using the past sensor signal, the event signal, and the maintenance history information and a "maintenance work suggestion phase" of detecting the abnormality sign based on the sensor signal, estimating the alarm by using the diagnosis model, and suggesting the maintenance work.

The process sequence in the diagnosis model creation phase will be described. First, the abnormality sign detection unit 603 detects the abnormality sign by using the past sensor signal. Next, the phenomenon pattern extraction unit 604 extracts the phenomenon pattern by using the same sensor signal. Next, the phenomenon pattern classification reference creation unit 605 creates the classification reference for classifying the phenomenon pattern by using the alarm included in the event signal as the teacher. Next, the phenomenon pattern classification unit 606 classifies the phenomenon pattern extracted from the sensor signal by using the classification reference created in the phenomenon pattern classification reference creation unit 605. Next, the diagnosis model creation unit 607 creates the diagnosis model for estimating the alarm from the phenomenon pattern classification result. Next, the related information correlation unit 609 correlates the past sensor signal and the event signal stored in the operation information DB 101 with the maintenance history information stored in the maintenance history information DB 102. Next, the work keyword extraction unit 610 extracts the work keyword based on the maintenance history information. Next, the phenomenon pattern classification reference creation unit 611 sets the work keyword as the teacher by using the correlated information of the related information correlation unit 609 and creates the classification reference for classifying the phenomenon pattern every alarm. Next, the phenomenon pattern classification unit 612 classifies the phenomenon pattern extracted from the sensor signal by using the classification reference of the corresponding alarm. Next, the diagnosis model creation unit 613 creates the diagnosis model for estimating the work keyword used for the maintenance worker to perform the maintenance work every alarm from the phenomenon pattern classification result using the correlated information of the related information correlation unit 609.

The process sequence in the maintenance work suggestion phase will be described. First, the abnormality sign detection unit 603 detects the abnormality sign by using the sensor signal (for example, the current sensor signal) as the diagnosis target. Next, the phenomenon pattern extraction unit 604 extracts the phenomenon pattern. Next, the phenomenon pattern classification unit 606 classifies the phenomenon pattern extracted by using the classification reference. Next, the alarm estimation unit 608 estimates the alarm by using the classification result of the phenomenon pattern classification unit 606 and the diagnosis model created in the diagnosis model creation unit 607. That is, the abnormality sign detection unit 603 detects the abnormality sign, and the alarm estimation unit 608 estimates the type of the alarm involved with the phenomenon pattern classified by the phenomenon pattern classification unit 606 (where the phenomenon pattern is expressed by a certain alarm or a possibility). Next, the phenomenon pattern classification unit 612 classifies the phenomenon pattern for the alarm of which the possibility is not zero by using the classification reference created by the phenomenon pattern classification reference creation unit 611. Next, the maintenance work suggestion unit 614 estimates the work keyword for suggesting the maintenance work content to the maintenance worker by using the phenomenon pattern classification result classified by the phenomenon pattern classification unit 612 and the diagnosis model created by the diagnosis model creation unit 613 and suggests the maintenance work based on the work keyword.

Furthermore, it is considered that the keyword illustrated in the maintenance work report may be biased by the alarm. For example, it is considered that the maintenance work report for the alarm involved with a decrease in oil pressure includes many keywords involved with oil pressure or a decrease in oil pressure. Therefore, as described above, the information processing apparatus 11 of FIG. 18 creates the diagnosis model every alarm and estimates the type of the alarm involved with the phenomenon pattern as the diagnosis target. Then, the information processing apparatus 11 may suggest the accurate work keyword to the maintenance worker by referring to the diagnosis model based on the phenomenon pattern for estimating the alarm.

Hereinafter, the operations of the blocks will be described in detail. However, the common point with the first embodiment will not be described. Furthermore, the operations of the abnormality sign detection unit 603, the phenomenon pattern extraction unit 604, and the work keyword extraction unit 610 are the same as those of the abnormality sign detection unit 103, the phenomenon pattern extraction unit 104, and the work keyword extraction unit 106 of FIG. 2.

The operation information DB 601 stores a date for storing the event signal and the event signal other than the date 101a and the sensor signal 101b described in FIG. 3. The event signal includes, for example, a code indicating the content of the alarm.

The maintenance history information DB 602 includes the same information as the maintenance history information DB 102 described in FIG. 4.

The phenomenon pattern classification reference creation unit 605 will be described. The phenomenon pattern classification reference creation unit 605 creates the classification reference by using the learning method with the teacher similarly to the phenomenon pattern classification reference creation unit 107. Furthermore, the phenomenon pattern classification reference creation unit 605 is operated in the diagnosis model phase and is not operated in the maintenance work suggestion phase.

First, the phenomenon pattern classification reference creation unit 605 creates the learned data for creating the classification reference including the characteristic amount and the teacher label. The characteristic amount is the phenomenon pattern extracted by the phenomenon pattern extraction unit 604, and the teacher label is the code of the alarm extracted from the event signal. The phenomenon pattern is extracted from the sensor signal segmented at the time before the generation time of the alarm. When the learning with the teacher is performed by using the input of the learned data, the classification reference for classifying the phenomenon pattern according to the alarm code is created. Similarly to the phenomenon pattern classification reference creation unit 107, any method may be used as the learning method with the teacher.

The phenomenon pattern classification unit 606 classifies the phenomenon pattern extracted by the phenomenon pattern extraction unit 604 in accordance with the classification reference created by the phenomenon pattern classification reference creation unit 605. By this process, a label is added to the phenomenon pattern. The teacher label which is used in the phenomenon pattern classification reference creation unit 605 will be referred to as the "teacher label of the alarm", and the label which is added herein will be referred to as the "diagnosis label of the alarm".

The diagnosis model creation unit 607 will be described. The diagnosis model creation unit 607 creates the alarm diagnosis model for estimating the alarm of the phenomenon pattern based on the phenomenon pattern classified by the phenomenon pattern classification unit 606 and the event signal. The diagnosis model creation unit 607 is operated in the diagnosis model phase and is not operated in the maintenance work suggestion phase.

FIG. 19 is a diagram illustrating the diagnosis model which is created by the diagnosis model creation unit 607. The diagnosis model is a matrix in which an alarm 701 is provided in the horizontal axis and a phenomenon pattern 702 is provided in the vertical axis, and is used to calculate the possibility of the generation of the alarm in a certain phenomenon pattern. The method of classifying the phenomenon pattern 702 is based on the "diagnosis label of the alarm". This is the same as the diagnosis model creation unit 109 of the first embodiment except for the determination method in the vertical axis and the horizontal axis.

The alarm estimation unit 608 obtains the possibility of each alarm by referring to the section of the phenomenon pattern 702 of the diagnosis model created by the diagnosis model creation unit 607 based on the "alarm diagnosis label" obtained in the phenomenon pattern classification unit 606, and suggests the alarm of which the possibility is not zero in high-possibility order.

The related information correlation unit 609 correlates the past sensor signal and the event signal stored in the operation information DB 601 in the diagnosis model creation phase with the maintenance history information stored in the maintenance history information DB 602. The process method is the same as that of the first embodiment, but the correlation is performed based on the alarm. That is, the related information correlation unit 609 extracts the alarm leading to the work in each maintenance history information, and segments and correlates the sensor signal obtained at the time which is earlier by a predetermined period than the alarm generation time before the work data.

The process of the phenomenon pattern classification reference creation unit 611 is the same as that of the phenomenon pattern classification reference creation unit 107. However, the phenomenon pattern classification reference creation unit 611 is different from the phenomenon pattern classification reference creation unit 107 in that the learned data for creating the classification reference is created from the maintenance history information DB 602 every alarm. Accordingly, the classification reference which is created in the phenomenon pattern classification reference creation unit 611 is dedicated for each alarm.

The phenomenon pattern classification unit 612 classifies the phenomenon pattern extracted in the phenomenon pattern extraction unit 604 in accordance with the classification reference created every alarm in the phenomenon pattern classification reference creation unit 611. By this process, a label is added to the phenomenon pattern. The teacher label which is used in the phenomenon pattern classification reference creation unit 611 will be referred to as the "work teacher label", and the label which is added herein will be referred to as the "work diagnosis label". The phenomenon pattern classification unit 612 selects and classifies the classification reference created in the phenomenon pattern classification reference creation unit 611 based on the alarm information extracted from the maintenance history information DB 602 in the diagnosis model creation phase. In the maintenance work suggestion phase, a plurality of the "work diagnosis labels" are obtained by selecting and classifying the classification reference created in the phenomenon pattern classification reference creation unit 611 with respect to all alarms of which the possibilities are not zero in the alarm estimation unit 608. The phenomenon pattern classification unit 612 correlates the alarm possibility information with the "work diagnosis label".

The diagnosis model creation unit 613 will be described. The diagnosis model creation unit 613 is operated in the diagnosis model phase and is not operated in the maintenance work suggestion phase.

FIG. 20 is a diagram illustrating the diagnosis model created by the diagnosis model creation unit 613. The diagnosis model is a matrix in which a work keyword 801 is provided in the horizontal axis and a phenomenon pattern 802 is provided in the vertical axis, and is used to calculate the possibility of the correct treatment of each keyword for a certain phenomenon pattern. In the example of FIG. 20, the possibility for the combination of a keyword 801a for the treatment and a keyword 801b for the treatment target is calculated.

The diagnosis model creation unit 613 creates the diagnosis model dedicated for each alarm. FIG. 20 illustrates an example of the diagnosis model with respect to a decrease in water pressure.

The method of classifying the phenomenon pattern 802 is based on the "work diagnosis label". In the example of FIG. 20, the possibility for the combination of the keyword 801a for the treatment and the keyword 801b for the treatment target is calculated. The calculation method is the same as that of the diagnosis model creation unit 109.

The maintenance work suggestion unit 614 obtains the possibility of each work keyword by referring to the diagnosis model created in the diagnosis model creation unit 613 based on the phenomenon pattern classified by the phenomenon pattern classification unit 612. This process is performed on each of the alarms of which the possibilities are not zero in the alarm estimation unit 608. In the individual processes, the maintenance works of which the possibilities are not zero are extracted. The possibility of each maintenance work is obtained by multiplying, for example, the possibility of the alarm obtained by the phenomenon pattern classification unit 612 by the maintenance work, and the possibilities are suggested in high-value order.

In this way, according to the second embodiment, since the information processing apparatus 11 sets the diagnosis model as a layered structure with the alarm diagnosis and the work diagnosis, it is possible to suggest the maintenance work and to suggest the estimation alarm. Further, the information processing apparatus 11 may decrease the number of the teacher labels which may be easily understood by the user, and hence the phenomenon pattern may be classified with high precision. For this reason, the highly reliable diagnosis model may be created.

Hereinafter, a GUI (Graphical User Interface) for displaying the diagnosis result of the information processing apparatus 11 will be described. Furthermore, it is assumed that the facility 12 is formed in accordance with different models or machines and the information processing apparatus 11 creates the diagnosis model for each of the models or the machines.

FIG. 21 is a diagram illustrating an example of the list display screen of the abnormality detection result of the information processing apparatus 11. As illustrated in FIG. 21, the information processing apparatus 11 displays a screen 901 on, for example, the display device 506 thereof or the display device of the terminal device 13.

As illustrated in the screen 901, the display device lists up the serial number, the site, and the machine number of the facility as the target, and the abnormality detection results thereof obtained before a predetermined period (for ten days in the example of the drawings) are displayed. The circle of FIG. 21 indicates a state where the abnormality sign is detected. The information processing apparatus 11 may display other events such as maintenance together. By the movement of the scroll bar, the lower part of the list or the past information may be referred. When any line is clicked, the specific information of the corresponding facility is displayed.

Figure 22:
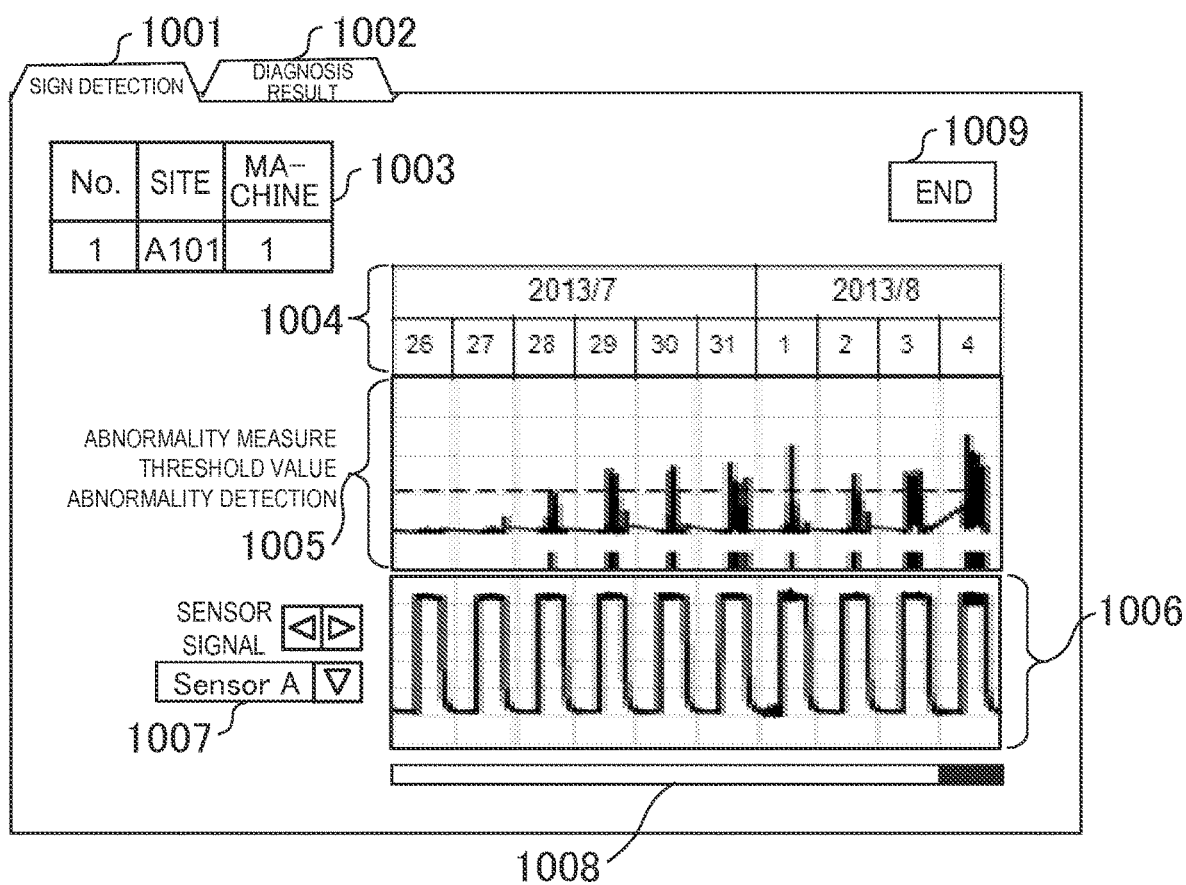
FIG. 22 is a diagram illustrating a screen example that specifically displays a selected facility.

FIG. 22 is a diagram illustrating a screen example that specifically displays a selected facility. As illustrated in FIG. 22, the screen of the selected facility includes a sign detection result display screen 1001 and a diagnosis result display screen 1002, and the screens may be switched by the upper tap of the screen.

The sign detection result display screen 1001 displays the information involved with the abnormality detection result and the sensor signal and the facility information. An apparatus information display part 1003 displays the serial number, the site, and the machine number of the target facility. The date display part 1004 displays a date. The abnormality detection result display window 1005 displays the abnormality measure of the corresponding date, the threshold value, and the time-series graph of the abnormality detection result.

The upper black solid line of the window indicates the abnormality measure, the dotted line indicates the threshold value, and the lower black solid line indicates the abnormality detection result (where the abnormality is 1 and the normality is 0). The sensor signal display window 1006 displays the time-series graph of the sensor signal of the corresponding date. The sensor signal of the display target is changed by the selection of the sensor signal selection window 1007.

Although not illustrated in the drawings, the time-series graph of the reference value may be displayed together. The display timing may be moved to the past by the movement of the scroll bar 1008. When an end button 1009 is pressed, the specific display screen is removed and the abnormality detection result list display screen is selected.

Figure 23:
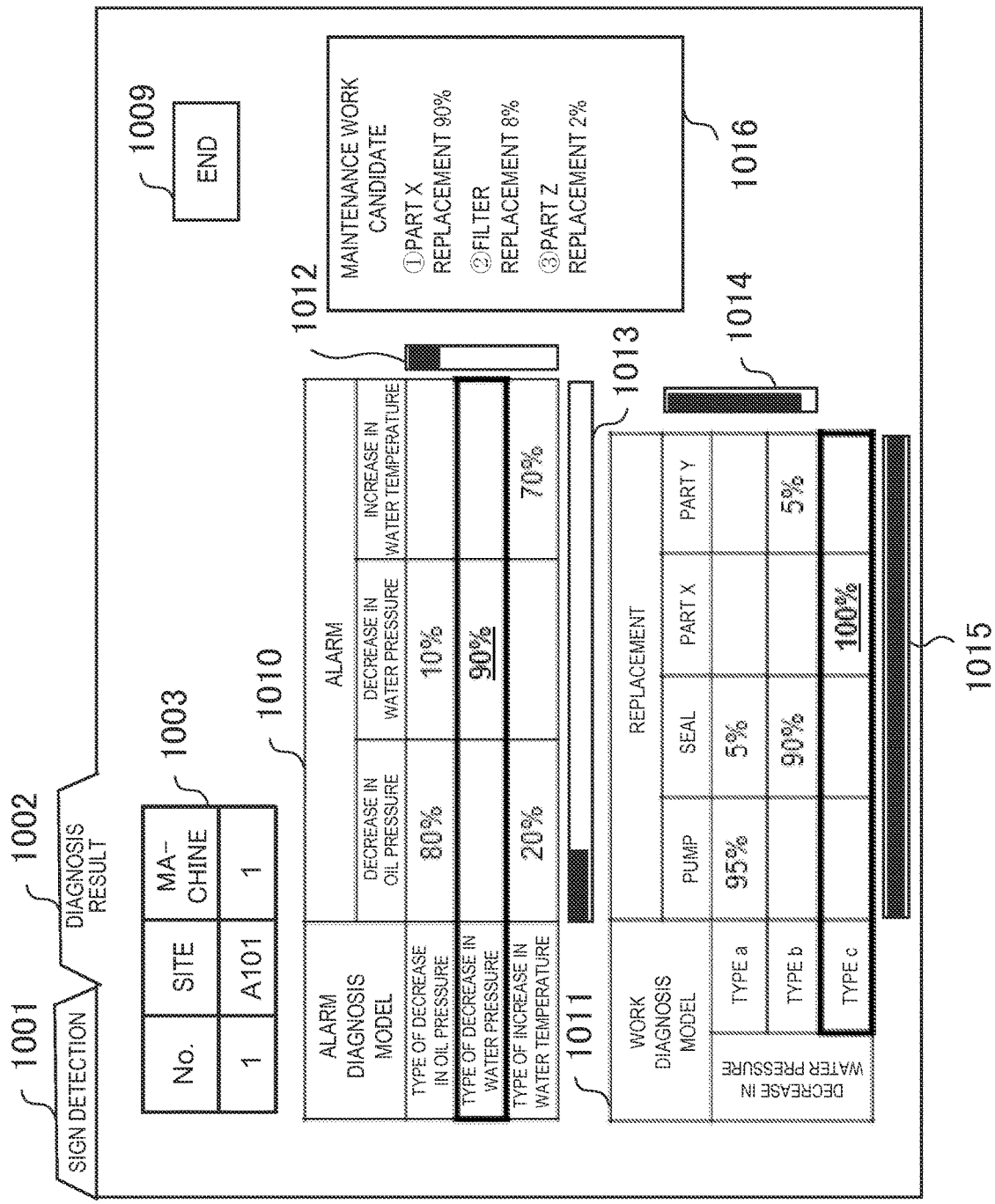
FIG. 23 is a diagram illustrating a screen example of a diagnosis result display screen.

FIG. 23 is a graph illustrating a screen example of the diagnosis result display screen 1002. The apparatus information display part 1003 and the end button 1009 illustrated in FIG. 23 are the same as those of the sign detection result display screen 1001 illustrated in FIG. 22.

The diagnosis result display screen 1002 includes an alarm diagnosis model display window 1010 and a work diagnosis model display window 1011. The alarm diagnosis model display window 1010 displays the diagnosis model created by the diagnosis model creation unit 607. Here, the section of the diagnosis label of the alarm, that is, the phenomenon pattern classification result of the current date of the selected facility is highlighted, and the numerical value of the section of the alarm having the highest possibility is underlined.

The work diagnosis model display window 1011 displays a part dedicated for the alarm having a high possibility in the diagnosis model created by the diagnosis model creation unit 613. Here, the section of the phenomenon pattern classification result, that is, the work diagnosis label is highlighted, and the numerical value of the section of the maintenance work having a high possibility is underlined.

By the movement of scroll bars 1012, 1013, 1014, and 1015, the display range of the diagnosis model may be changed. A maintenance work suggestion window 1016 displays the maintenance work having a possibility in accordance with the result of both the alarm diagnosis model display window 1010 and the work diagnosis model display window 1011 in high-possibility order. For example, the maintenance work suggestion window 1016 displays the "PART X REPLACEMENT 90%" as the example of the maintenance work candidate. The "PART X REPLACEMENT 90%" may be obtained by multiplying the possibility of 90% involved with a decrease in water pressure by the possibility of 100% involved with the part replacement X.

When the underlined numerical value is clicked, the list of the classified past information is displayed in the section. Thus, when one line of the list is clicked, the maintenance history information correlated with the same information as FIG. 22 is displayed.

While the embodiments of the invention have been described, the technical scope of the invention is not limited to the scope of the embodiments. It is obvious that various modifications or improvements may be made on the above-described embodiments by the person skilled in the art. Further, the invention may be provided as the information processing apparatus 11, the method of controlling the information processing apparatus 11, the control program, and the storage medium storing the program.

What is claimed is:

1. An information processing apparatus to detect an abnormality sign of a facility based on a signal obtained from one or more sensors of the facility and suggest maintenance work for the abnormality sign, the apparatus comprising:
    a computer-readable storage device; and
    a processor configured to:
        extract a phenomenon pattern of a past sensor signal of the facility by using the sensor signal as a source of the phenomenon pattern;
        correlate the sensor signal with maintenance history information related to past maintenance work of the facility stored in the computer-readable storage device;
        create a classification reference for classifying the phenomenon pattern based on a work keyword included in the maintenance history information correlated with the sensor signal as the source of the phenomenon and the phenomenon pattern;
        classify the phenomenon pattern based on the classification reference; and
        create a diagnosis model for estimating a work keyword to be suggested to a maintenance worker of the facility based on a label of the classified phenomenon pattern in order for the maintenance worker to perform maintenance work in accordance with the estimated work keyword,
    wherein the diagnosis model includes a calculated probability value of the suggested work keyword relative to the phenomenon pattern being accurate.

2. The information processing apparatus according to claim 1,
    wherein the processor is configured to:
        extract a diagnosis target phenomenon pattern of a diagnosis target sensor signal as the diagnosis target of the facility,
        classify the diagnosis target phenomenon pattern based on the classification reference, and
        extract a work keyword suggested to a maintenance worker by referring to the diagnosis model based on the diagnosis target phenomenon pattern.

3. The information processing apparatus according to claim 2, wherein the processor is further configured to:
    create an alarm classification reference for classifying the phenomenon pattern by using an alarm included in a past event signal of the facility as a teacher;
    classify the phenomenon pattern based on the alarm classification reference;
    create an alarm diagnosis model for estimating the alarm of the diagnosis target phenomenon pattern based on the alarm and the phenomenon pattern; and
    estimate the alarm of the diagnosis target phenomenon pattern based on the alarm diagnosis model,
    wherein the processor is configured to:
    create the classification reference for each alarm,
    create the diagnosis model for each alarm,
    classify the diagnosis target phenomenon pattern, in which the alarm is estimated, based on the classification reference for each alarm, and
    extract a work keyword suggested to a maintenance worker by referring to the diagnosis model for each alarm based on the diagnosis target phenomenon pattern.

4. The information processing apparatus according to claim 1,
    wherein the work keyword is extracted based on a correlated value included in the maintenance history information.

5. The information processing apparatus according to claim 4,
    wherein the maintenance history information includes a maintenance cost or a downtime of the facility, and the correlated value is the maintenance cost or the downtime of the facility.

6. The information processing apparatus according to claim 4,
    wherein the correlated value is an abnormality measure calculated based on the sensor signal.

7. The information processing apparatus according to claim 4,
    wherein the correlated value is a numerical value that represents an existence of a specific keyword in the maintenance history information.

8. The information processing apparatus according to claim 1,
    wherein the classification reference is determined based on a learning method with a teacher by using the work keyword as a teacher label.

9. The information processing apparatus according to claim 1,
    wherein the phenomenon pattern is expressed by an accumulation value of a residual vector calculated as a difference between an observation vector and a reference vector from the sensor signal.

10. The information processing apparatus according to claim 9,
    wherein the reference vector is calculated by using a local sub-space classifier.

11. The information processing apparatus according to claim 1,
    wherein the phenomenon pattern is expressed by an accumulation value of an isolation vector calculated based on a two-dimensional distribution density of learned data from the sensor signal.

12. The information processing apparatus according to claim 1,
wherein the phenomenon pattern is expressed by a histogram characteristic calculated by a bag-of-features method from the sensor signal.

13. The information processing apparatus according to claim 1,
wherein the diagnosis model is expressed by the probability calculated based on the phenomenon pattern classification result and a two-dimensional frequency distribution of the work keyword.

14. A method of diagnosing a facility by detecting an abnormality sign of the facility based on a signal obtained from one or more sensors of the facility to suggest maintenance work for the abnormality sign, the method comprising the acts of:
    extracting, by a processor, a phenomenon pattern of a past sensor signal of the facility by using the sensor signal as a source of the phenomenon pattern;
    correlating, by the processor, the sensor signal with maintenance history information related to past maintenance work of the facility stored in a computer-readable storage device;
    creating, by the processor, a classification reference for classifying the phenomenon pattern based on a work keyword included in the maintenance history information correlated with the sensor signal as the source of the phenomenon and the phenomenon pattern extracted by the extracting of the phenomenon pattern;
    classifying, by the processor, the phenomenon pattern based on the classification reference created by the creating of the classification reference; and
    creating, by the processor, a diagnosis model for estimating a work keyword to be suggested to a maintenance worker of the facility based on a label of the classified phenomenon pattern classified by the classifying of the phenomenon pattern in order for the maintenance worker to perform maintenance work in accordance with the estimated work keyword, the diagnosis model including a calculated probability value of the suggested work keyword relative to the phenomenon pattern being accurate.

15. A non-transitory computer-readable storage medium storing a program that causes a processor, which is to detect an abnormality sign of a facility based on a signal obtained from one or more sensors of the facility to suggest maintenance work for the abnormality sign, to perform a method comprising the acts of:
    extracting a phenomenon pattern of a past sensor signal of the facility by using the sensor signal as a source of the phenomenon pattern;
    correlating the sensor signal with maintenance history information related to past maintenance work of the facility stored in a computer-readable storage device;
    creating a classification reference for classifying the phenomenon pattern based on a work keyword included in the maintenance history information correlated with the sensor signal as the source of the phenomenon and the phenomenon pattern;
    classifying the phenomenon pattern based on the classification reference; and
    creating a diagnosis model for estimating a work keyword to be suggested to a maintenance worker of the facility based on a label of the classified phenomenon pattern in order for the maintenance worker to perform maintenance work in accordance with the estimated work keyword, wherein
    the diagnosis model includes a calculated probability value of the suggested work keyword relative to the phenomenon pattern being accurate.

\* \* \* \* \*